US012038238B2

United States Patent
Teulet et al.

(10) Patent No.: US 12,038,238 B2
(45) Date of Patent: Jul. 16, 2024

(54) HEAT EXCHANGER AND METHOD FOR MANUFACTURING SUCH A HEAT EXCHANGER

(71) Applicant: INETYX, Châteaugay (FR)

(72) Inventors: Patrick Teulet, Riom (FR); Emile Cottier, Bussieres et Pruns (FR)

(73) Assignee: INETYX, Châteaugay (FR)

( * ) Notice: Subject to any disclaimer, the term of this patent is extended or adjusted under 35 U.S.C. 154(b) by 663 days.

(21) Appl. No.: 16/979,132

(22) PCT Filed: Mar. 8, 2019

(86) PCT No.: PCT/EP2019/055865
§ 371 (c)(1),
(2) Date: Sep. 8, 2020

(87) PCT Pub. No.: WO2019/170868
PCT Pub. Date: Sep. 12, 2019

(65) Prior Publication Data
US 2020/0400378 A1 Dec. 24, 2020

(30) Foreign Application Priority Data

Mar. 9, 2018 (FR) ..................................... 1852050

(51) Int. Cl.
*F28D 9/00* (2006.01)
*B23K 11/00* (2006.01)
(Continued)

(52) U.S. Cl.
CPC ........ *F28D 9/0062* (2013.01); *B23K 11/0026* (2013.01); *B23K 11/34* (2013.01);
(Continued)

(58) Field of Classification Search
CPC .... F28D 9/0062; F28D 17/02; F28D 21/0001; B23K 26/60; B23K 11/0026;
(Continued)

(56) References Cited

U.S. PATENT DOCUMENTS 3,940,301 A * 2/1976 Straw .................... C04B 35/593
156/89.27
4,017,347 A * 4/1977 Cleveland ......... C04B 35/63484
156/89.27
(Continued)

FOREIGN PATENT DOCUMENTS

| CH | 411 012 | 4/1966 |
| DE | 197 40 502 | 3/1999 |

(Continued)

OTHER PUBLICATIONS

International Search Report for PCT/EP2019/055865 mailed Jun. 17, 2019, 6 pages.
(Continued)

*Primary Examiner* — Tho V Duong
*Assistant Examiner* — Raheena R Malik
(74) *Attorney, Agent, or Firm* — NIXON & VANDERHYE

(57) ABSTRACT

This heat exchanger includes fluid circulation channels extending lengthwise along a first axis, and layers that are flat and superposed on one another along a second axis. To improve performance, each layer is made up of metal strips so the strips a layer all extend lengthwise perpendicular to the second axis and adjacent one another, without necessarily touching. Each channel is jointly defined by first through third layers, the second being intercalated, along the second axis, directly between the first and third layers so each channel is delimited by a face of the first and third layers and edges of the second layer running parallel to the first axis (Continued)

and transversely to the second layer, these edges being formed by strips of this second layer fusion-welded to the first and third layers in zones extending along the length of the channel and situated on either side of the channel.

20 Claims, 11 Drawing Sheets

(51) Int. Cl.
  *B23K 11/34*  (2006.01)
  *B23K 26/36*  (2014.01)
  *B23K 26/60*  (2014.01)
  *F28D 17/02*  (2006.01)
  *F28D 21/00*  (2006.01)
  *F28F 3/08*  (2006.01)
  *B23K 101/14*  (2006.01)
  *B23K 103/12*  (2006.01)

(52) U.S. Cl.
  CPC .............. *B23K 26/36* (2013.01); *B23K 26/60* (2015.10); *F28D 17/02* (2013.01); *F28D 21/0001* (2013.01); *F28F 3/08* (2013.01); *B23K 2101/14* (2018.08); *B23K 2103/12* (2018.08); *F28F 2275/067* (2013.01)

(58) Field of Classification Search
  CPC .... B23K 11/34; B23K 26/36; B23K 2103/12; B23K 2101/14; F28F 3/08; F28F 2275/067
  See application file for complete search history.

(56) References Cited

U.S. PATENT DOCUMENTS

| | | | |
|---|---|---|---|
| 4,822,660 A * | 4/1989 | Lipp | ..................... C03B 19/06 428/113 |
| 9,091,049 B2 * | 7/2015 | Walker | ..................... E04C 2/38 |
| 10,415,901 B2 * | 9/2019 | Ranjan | ..................... F28F 21/04 |
| 10,553,522 B1 * | 2/2020 | Canaperi | ............... F28F 21/089 |
| 2004/0098854 A1 | 5/2004 | Schmitt | |
| 2004/0099712 A1 | 5/2004 | Tonkovich et al. | |
| 2015/0137412 A1 | 5/2015 | Schalansky | |
| 2018/0071950 A1 * | 3/2018 | Richards | ................. C04B 35/58 |
| 2022/0316813 A1 * | 10/2022 | Rambo | ............... F28D 1/05333 |

FOREIGN PATENT DOCUMENTS

| | | | |
|---|---|---|---|
| DE | 19740502 A1 * | 3/1999 | ............. B22F 7/004 |
| DE | 10 2007 048 206 | 4/2009 | |
| DE | 10 2008 052 875 | 4/2010 | |
| FR | 1 582 377 | 9/1969 | |
| FR | 3 046 559 | 7/2017 | |
| GB | 1 214 219 | 12/1970 | |
| JP | S62112487 U | 7/1987 | |
| WO | 2004/109211 A1 | 12/2004 | |
| WO | 2017/121746 A1 | 7/2017 | |

OTHER PUBLICATIONS

Search Report for FR Application No. 1852050 dated Oct. 31, 2018, 4 pages.
Office Action issued in Korean Patent Application No. 10-2020-7028978 dated Oct. 13, 2023.

* cited by examiner

HEAT EXCHANGER AND METHOD FOR MANUFACTURING SUCH A HEAT EXCHANGER

This application is the U.S. national phase of International Application No. PCT/EP2019/055865 filed Mar. 8, 2019 which designated the U.S. and claims priority to FR Patent Application No. 1852050 filed Mar. 9, 2018, the entire contents of each of which are hereby incorporated by reference.

The present invention relates to a heat exchanger. It also relates to a method for manufacturing such a heat exchanger.

The invention relates to both heat exchangers of the recuperator type and heat exchangers of the regenerator type. The main function of a heat exchanger of the recuperator type is to allow the transfer of thermal energy through walls of the exchanger, between a first fluid and a second fluid that pass through the exchanger, without there being any mixing between the two fluids. The two fluids implemented in this context can have different physical and chemical characteristics. The main function of a heat exchanger of the regenerator type is on the one hand to store thermal energy in its walls provided by a fluid that passes through it, and on the other hand to next return the thermal energy having been stored in its walls to a fluid that passes through the exchanger.

The performance of heat exchangers, whether they are recuperators or regenerators, is directly linked to the geometry of their fluid circulation channels, as well as to the nature of the component materials of these exchangers. Generally, heat exchangers are characterized by the ratio between their exchange surface and their exchange volume. For example, for an exchanger with steel plates and fins, this ratio is typically about 2000 $m^2/m^3$, the plates of this exchanger typically having a thickness inclusively between 0.5 and 1 mm, while its fins typically have a thickness inclusively between 0.15 and 0.75 mm.

US 2004/099712, US 2004/098854 and DE 10 2007 048206 propose exchangers with multilayer structures, the fluid circulation channels of which are delimited by metal strips deposited and secured on a plate. The plate is provided to be "wide" enough to position the "fine" strips there forming the lateral edges of each channel, and to form, with these strips, a subassembly that makes it possible, by stacking with other subassemblies of the same type, to obtain a functional multilayer structure as long as the assembly of the subassemblies with one another is done with precautions, in particular by easing or reinforcing the structure to prevent deformation thereof during this assembly.

These various exchangers, and more generally the commercially available heat exchangers, often have a configuration that has the drawback that their head losses increase while the flow rate of the passage section for the fluid(s) decreases. These head losses are also linked to the surface state of the walls of the exchanger, through which the heat exchange is done and against which the fluid(s) flow.

The aim of the present invention is to propose a new heat exchanger having improved performance levels.

To that end, the invention relates to a heat exchanger, including channels for circulation of a fluid, which extend lengthwise along a first axis between respective opposite ends of the channels and in which the fluid is intended to flow between said ends along the first axis, the heat exchanger comprising a plurality of layers that are flat and superimposed on one another along a second axis that is both perpendicular to respective planes of the layers and perpendicular to the first axis. Each layer of the plurality of layers is made up of metal strips such that the strips of a same layer all extend lengthwise along a direction perpendicular to the second axis and are adjacent to one another, without necessarily touching, in the plane of the considered layer, each of the strips of each layer of the plurality of layers occupying the entire thickness, along the second axis, of the corresponding layer. Each of the channels is defined jointly by first, second and third layers among the plurality of layers, the second layer associated with each channel being intercalated, along the second axis, directly between the first layer and the third layer that are associated with this channel, such that each channel is delimited by:

a face of the first layer associated with this channel, which faces, along the second axis, toward the second and third layers associated with this channel, a face of the third layer associated with this channel, which faces, along the second axis, toward the first and second layers associated with this channel, and edges of the second layer associated with this channel, which are arranged parallel to the first axis and transverse to the plane of this second layer, these edges being formed by strips of this second layer that are fusion welded to the first and third layers associated with this channel over fusion zones that extend continuously over the entire length of the channel between its opposite ends and that are located, along a third axis perpendicular to the first and second axes, on either side of the channel.

The idea at the base of the invention is to delimit the channels in which the fluid circulates by superimposed layers, which are each made up of metal strips and which are welded to one another by fusion. In particular, each channel is delimited by the faces, opposite one another, of two layers separated from one another by a single intercalated layer that delimits the rest of the channel: in other words, the cross-section of the channels, in a section plane perpendicular to the longitudinal axis of the channel, is both made up of two opposite rectilinear sides, which are respectively formed by the two aforementioned separate layers, and of two other opposite sides, which are respectively formed by the border of strips of the aforementioned intercalated layer. In practice, this section can typically be rectangular. It will be understood that the area of the cross-section of the channels can thus have a low value, which is directly linked to the thickness of the aforementioned intercalated layer and the separation between the aforementioned borders of the strips of this intercalated layer, while the channels can extend over a very large longitudinal expanse: for such channels, the ratio of the exchange surface, that is to say the area of the wall of the channels, to the exchange volume, that is to say the volume of the channels, can then be very high, typically greater than 10,000 $m^2/m^3$. These channels can thus be described as micro-channels and the heat exchanger of the invention can thus be described as micro-exchanger. As an example, the height of each channel, in other words the thickness of the aforementioned intercalated layer, can be less than or equal to 0.1 mm and/or the width of each channel, in other words the separation between the aforementioned borders of the strips of the aforementioned intercalated layer, can be less than or equal to 1 mm. This being said, the invention does not preclude, in particular for productivity reasons, that the height and/or the width of each channel can be greater, for example respectively being equal to 0.5 mm and 5 mm, or even more, subject to the use of thick enough metal strips, as long as a suitable welding power is available, in particular a suitable laser power, to be able to weld the layers by fusion as set out by the invention.

The exchanges between the wall of the channels of the exchanger according to the invention and the fluid that circulates in these channels are thus maximized, while limiting the exchange volume so as not to impact the thermodynamic performance levels of the device in which the exchanger is integrated, such as a Stirling motor, the power of which decreases when the exchange volume increases, also called "dead space" because it corresponds to the quantity of fluid present in the channels at each operating instant.

Furthermore, using layers of metal strips, which, by group of three superimposed layers, delimit each channel of the heat exchanger according to the invention, makes it possible to control the surface state of the wall of the channels, in particular the surface state of the two faces delimiting each channel, formed by the two layers separated by the aforementioned intercalated layer. In particular, the surface roughness Ra can be less than or equal to 0.8 µm, or even less than or equal to 0.3 µm. In this way, the head losses for the fluid circulating in the channels are limited and the boundary layer thickness for the fluid against the wall of the channels is reduced, which increases the heat exchange.

Furthermore, the invention provides that the superimposed layers of the heat exchanger, which, per group of three superimposed layers, delimit each channel, are welded to one another on either side of each channel and all along this channel. Each channel is thus made tight reliably. Additionally, these welds are done by direct fusion of the layers to one another, which amounts to saying that these welds are done without added metal: this guarantees both that each channel has a high resistance to pressure and that the thermal conductivity is controlled by metallurgical continuity.

According to additional advantageous features of the exchanger according to the invention:
  The second layer associated with each channel has a thickness that is less than or equal to 0.1 mm, and the edges associated with each channel are distant, along the third axis, by 1 mm or less than 1 mm.
  The face of the first layer and the face of the third layer that are associated with each channel have a surface roughness Ra less than or equal to 0.8 µm.
  The edges associated with each channel have a surface roughness Ra less than or equal to 0.8 µm.
  The face of the first layer and the face of the third layer that are associated with each channel, as well as the edges associated with this channel have a surface roughness Ra less than or equal to 0.3 µm.

The heat exchanger according to the invention can be designed as recuperator exchanger, while allowing a heat exchange, through layers making up this exchanger, between two fluids that pass through the exchanger separately. To that end, the invention provides that for this recuperator exchanger, said channels are first channels for circulation of a first fluid. For each first channel, the strips of the second layer associated with this first channel, which form the edges delimiting the first channel at this second layer, are a first strip and a second strip that extend lengthwise along the first axis and respectively on either side, along the third axis, of the first channel. The heat exchanger includes at least one second channel for circulation of a second fluid:
  that extends lengthwise along the first axis between respective opposite ends of the second channel,
  in which the second fluid is intended to flow between the ends of the second channel along the first axis, and
  that is arranged at a same level, along the second axis, as at least some of the first channels, while being partially delimited by the first or the second strip of the second layers associated with said at least some of the first channels.

The invention thus makes it possible for the body of the exchanger, made up of layers of metal strips, to have a very high thermal conductivity, for example of the order of 300 W/m.° K when the strips of the layers are made from copper or copper-based alloy, such as $CuZn_2$: such a high value of the thermal conductivity decreases the temperature difference between the two fluids passing through the exchanger and therefore increases the efficiency of the recuperator exchanger. This effect is even more pronounced when this value of the thermal conductivity is preserved for the entire exchanger owing to the metallurgical continuity resulting from the fusion welding between the layers of the exchanger. Furthermore, the layered structure of the recuperator exchanger according to the invention makes it possible to limit the material thickness separating the first and second channels, which facilitates the heat exchanges tween the two fluids, having recalled that the thermal resistance of a wall is proportional to the thickness of the latter.

According to additional advantageous features of the recuperator exchanger according to the invention:
  For each first channel, the face of the first layer associated with this first channel is formed by a strip of this first layer, which extends lengthwise along the first axis and which, along the third axis, overflows on either side of this first channel so as to be both superimposed with and welded on the corresponding fusion zones with the first and second strips of the second layer associated with this first channel, and
  for each first channel, the face of the third layer associated with this first channel is formed by a strip of this third layer, which extends lengthwise along the first axis and which, along the third axis, overflows on either side of this first channel so as to be both superimposed with and welded on the corresponding fusion zones with the first and second strips of the second layer associated with this first channel.
  The or each second channel is defined jointly by first and second layers and a group of superimposed layers among the plurality of layers, the group of superimposed layers associated with this second channel being intercalated, along the second axis, directly between the first layer and the second layer associated with this second channel, such that the or each second channel is delimited by:
    a face of the first layer associated with this second channel, which faces, along the second axis, toward the third layer and the group of superimposed layers associated with the second channel,
    a face of the second layer associated with this second channel, which faces, along the second axis, toward the first layer and the group of superimposed layers associated with the second channel, and
    edges of the group of superimposed layers associated with this second channel, which are each arranged parallel to the first axis and transverse to respective planes of the layers of this group of superimposed layers, these edges being formed by strips of the layers of the group of superimposed layers, which:
      extend lengthwise along the first axis,
      are, at each of the layers of the group of superimposed layers, fusion welded to the layer(s) of said group, which are immediately superimposed on the considered layer, or otherwise, to the first layer or to the second layer, over fusion zones that extend continuously over the entire length of the second channel between the opposite ends of this second channel and that are located, along the third axis, on either side of this second channel, and include the first and/or second strips of the second layer of each of said at least some first channels.

The invention also relates to a method for manufacturing a recuperator exchanger as defined above. In this method, the layers of the plurality of layers of the heat exchanger are made one after the other such that each layer of the plurality of layers, which is newly made, is superimposed, along the second axis, on a layer of the plurality of layers, previously made, or, in the absence of this layer previously made, on a flat metal substrate that is perpendicular to the second axis. To produce each first channel, it is successively provided that:

i) after having deposited the first layer associated with this first channel, this first layer is flattened on its face facing, along the second axis, away from a layer previously made or, in the absence of the latter, opposite the substrate, ii) the first and second strips of the second layer associated with this first channel are deposited on this first layer, while extending lengthwise along the first axis and respectively on either side, along the third axis, of the first channel to be made, and are fusion welded with this first layer on the fusion zones for these first and second layers, iii) this second layer is flattened on its face facing, along the second axis, away from the first layer, and iv) the third layer associated with this first channel is deposited on the first and second strips of the second layer and fusion welded with these strips on the fusion zones for the second and third layers, and at least some of the first channels are made one after the other, by using the third layer of a first channel previously made as first layer of a first channel to be made and by repeating steps i), ii), iii) and iv).

Furthermore, the heat exchanger according to the invention can be designed as a regenerator exchanger, allowing a heat exchange between the fluid and a wall of the exchanger in two stages: in a first stage, the fluid circulates inside the channels such that heat exchange is done from the fluid toward the wall and the thermal energy is stored therein; after the fluid has undergone a transformation outside the exchanger, in particular of the temperature, pressure or phase change type, the fluid circulates, secondly, in the opposite direction in the exchanger such that the wall of the latter returns all or part of the thermal energy to the fluid that had been stored there in the first stage. To that end, the invention provides that for this regenerator exchanger, for each channel, the strips of the first layer associated with this channel, the strips of the second layer associated with this channel and the strips of the third layer associated with this channel extend lengthwise along the third axis and are distributed into first strips made from a first metal and second strips made from a second metal, the first metal having a thermal conductivity different from that of the second metal, these first and second strips being, at each of the first, second and third layers associated with the channel, arranged alternating along the first axis such that the first strips of the first, second and third layers associated with the channel are superimposed along the second axis and the second strips of the first, second and third layers associated with the channel are superimposed along the second axis. For each channel, each of the first and second strips of the second layer associated with this channel is locally interrupted, along its length, so as to form the edges delimiting this channel.

The invention makes it possible to obtain, within the regenerator exchanger, an anisotropic thermal conductivity owing to the alternating, in each layer, of strips whereof the respective metals have different thermal conductivities from one another, this alternating of the strips being provided parallel to the flow direction of the fluid in the channels, which the layers of the exchanger delimit per group of three superimposed layers. This alternating of conductive and insulating strips in each layer makes it possible for the longitudinal thermal conductivity of the exchanger, that is to say the thermal conductivity parallel to the direction of the alternating of the strips of each layer, to be minimal and, in particular comparatively, for the transverse thermal conductivity of the exchanger, that is to say the thermal conductivity perpendicular to the direction of the alternating of the strips of each layer, to be maximal. By limiting the longitudinal thermal conductivity of the regenerator exchanger according to the invention, in particular compared to an exchanger made up only of a single metal having an intermediate thermal conductivity between the respective thermal conductivities of the two metals used for the regenerator exchanger of the invention, the thermal energy losses by conduction are reduced in the layers of the exchanger between the two opposite sides of the latter on which the channels emerge: inasmuch as, during use, the regenerator exchanger is associated with a hot source and a cold source, such as hot and cold recuperators, which are respectively provided at the opposite ends of the channels in between which the fluid circulates via the channels of the exchanger, the minimization of the longitudinal thermal conductivity makes it possible to limit thermal leaks, through the regenerator exchanger, between these hot and cold sources; in particular, by alternating the insulating and conductive strips in the layers of the exchanger, the storage of the energy between the hot source and the cold source is maximized, by creating temperature plateaus approaching a linear evolution of the temperature from the cold temperature of the cold source to the hot temperature of the hot source, while minimizing the losses by conduction in the layers of the regenerator exchanger. By increasing the transverse thermal conductivity, in particular compared to an exchanger that is made up of only a single metal having an intermediate thermal conductivity between the respective thermal conductivities of the two metals used for the regenerator exchanger of the invention, one simultaneously raises the thermal effusivity of the regenerator exchanger, that is to say the capacity of the latter to exchange thermal energy with its environment, and the exchange dynamic, called diffusivity, that is to say the ability of the exchanger to transmit a temperature signal from one point to another, in connection with its thermal conductivity and its thermal capacity, in particular compared to an exchanger made up of only a single metal having an intermediate thermal conductivity between the respective thermal conductivities of the two metals used for the regenerator exchanger of the invention.

According to additional advantageous features of the regenerator exchanger according to the invention:

For each channel:

each of the first strips of the second layer associated with this channel is completely fusion welded both with the first strip of the first layer associated with the channel, with which this first strip of the second layer is superimposed, and with the first strip of the third layer, with which this first strip of the second layer is superimposed, forming the fusion zones for the first and second layers, and each of the second strips of the second layer associated with this channel is completely fusion welded both with the second strip of the first layer associated with this channel, with which this second strip of the second layer is superimposed, and with the second strip of the third layer associated with this channel, with which this second strip of the second layer is superimposed, forming the fusion zones for the second and third layers.

Said channels are first channels for circulation of the fluid, and the heat exchanger further includes at least one second channel for thermal insulation:

that extends lengthwise along the first axis between respective opposite ends of this second channel, in which a thermal insulator is received, and that is arranged at a same level, along the second axis, as at least some of the first channels, while being delimited by the first and second strips of the first, second and third layers of said at least some first channels.

The invention also relates to a method for manufacturing a regenerator exchanger as defined above. In this method, the layers of the plurality of layers of the heat exchanger are made one after the other such that each layer of the plurality of layers, which is newly made, is superimposed, along the second axis, on a layer of the plurality of layers, which is previously made, or, in the absence of this layer previously made, on a flat metal substrate that is perpendicular to the second axis. To produce each channel, it is successively provided that:

i) after having deposited the first and second strips of the first layer associated with this channel, this first layer is flattened on its face facing, along the second axis, away from the layer previously made or, in the absence of the latter, opposite the substrate, ii) the first strips of the second layer associated with this channel are deposited on and are fusion welded with the first strips of this first layer and the second strips of this second layer are deposited on and are fusion welded with the second strips of this first layer, while forming the fusion zones for the first and second layers, iii) this second layer is flattened on its face facing, along the second axis, away from this first layer, and the channel to be made is machined by removal of material in this second layer by interrupting each of the first and second strips of this second layer locally along its length, and iv) the first strips of the third layer associated with this channel are deposited on and are fusion welded with the first strips of this second layer and the second strips of this third layer are deposited on and are fusion welded with the second strips of this third layer, while forming the fusion zones for the second and third layers, and at least some of the channels are made one after the other, by using the third layer of a channel previously made as first layer of a channel to be made and by repeating steps i), ii), iii) and iv).

According to one additional advantageous feature of this method, during steps ii) and iv), the first strips and the second strips are deposited such that a lateral fringe of each strip overlaps, along the second axis, the strip that extends along this lateral fringe.

The invention will be better understood upon reading the following description, provided solely as an example and done in reference to the drawings, in which.

Figure 1:
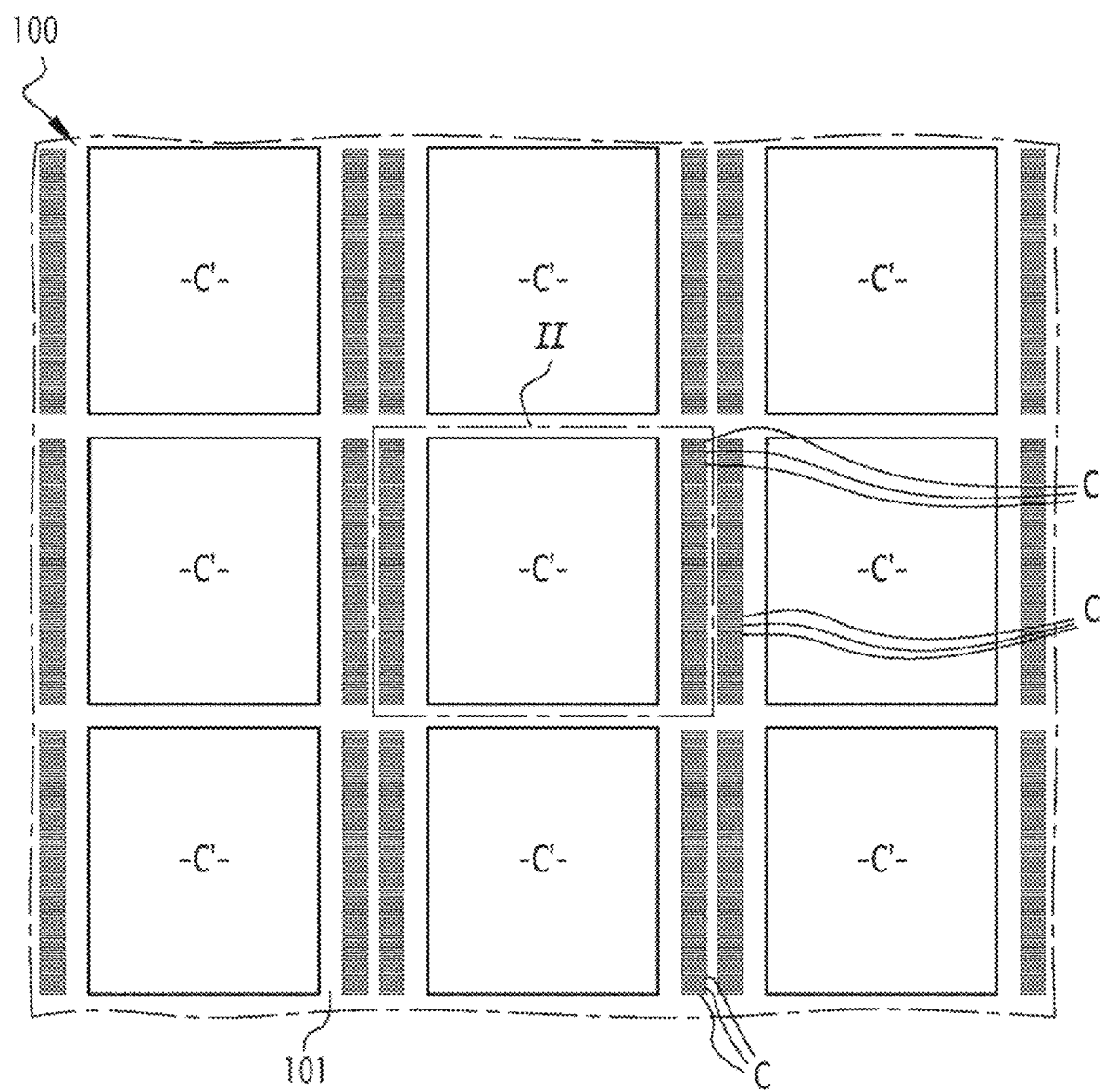
FIG. 1 is an elevation view of a first embodiment of a heat exchanger according to the invention, namely a recuperator exchanger.
Figure 2:
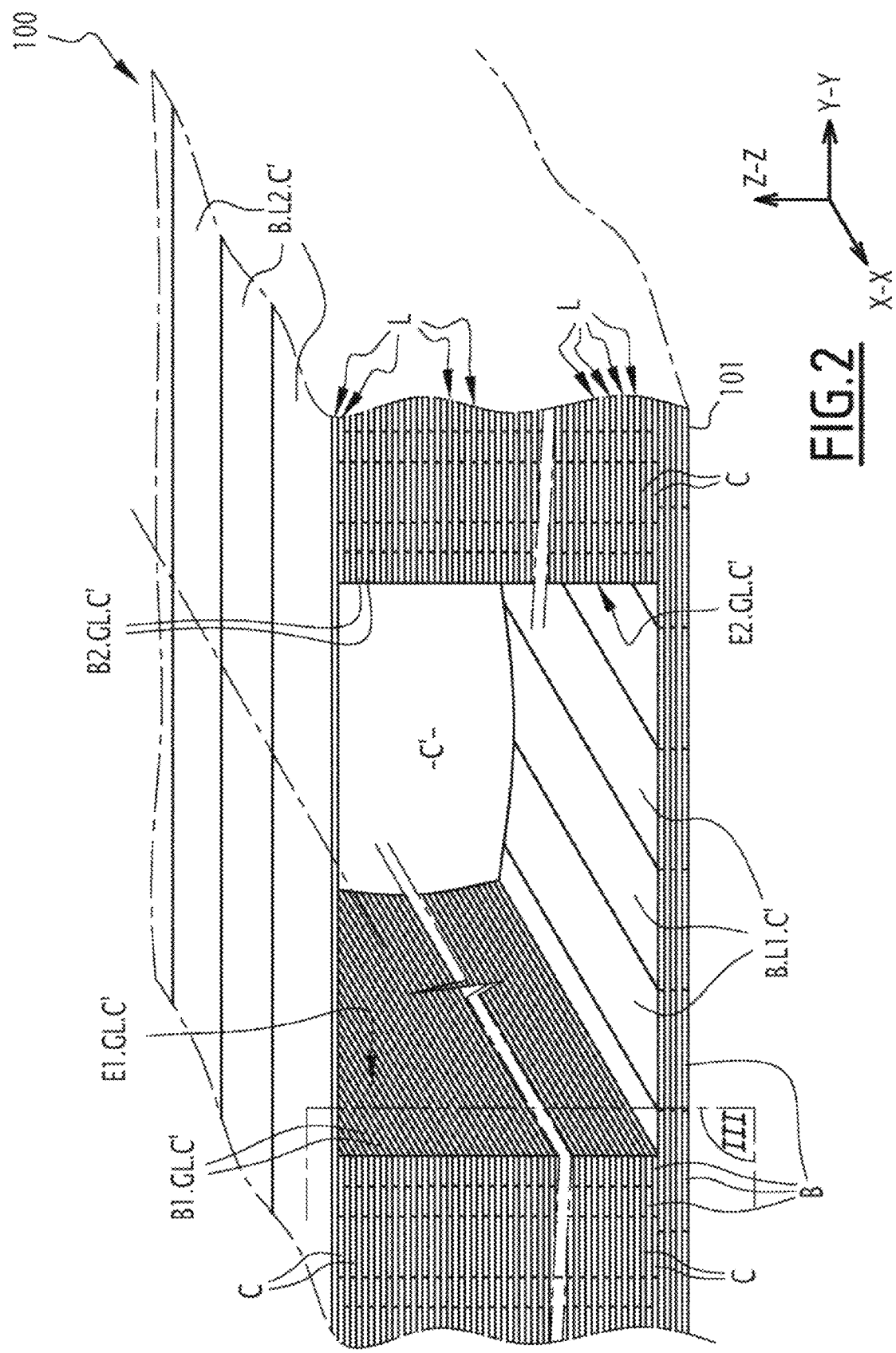
FIG. 2 is a perspective view of a part, box II in FIG. 1, of the exchanger of FIG. 1.
Figure 3:
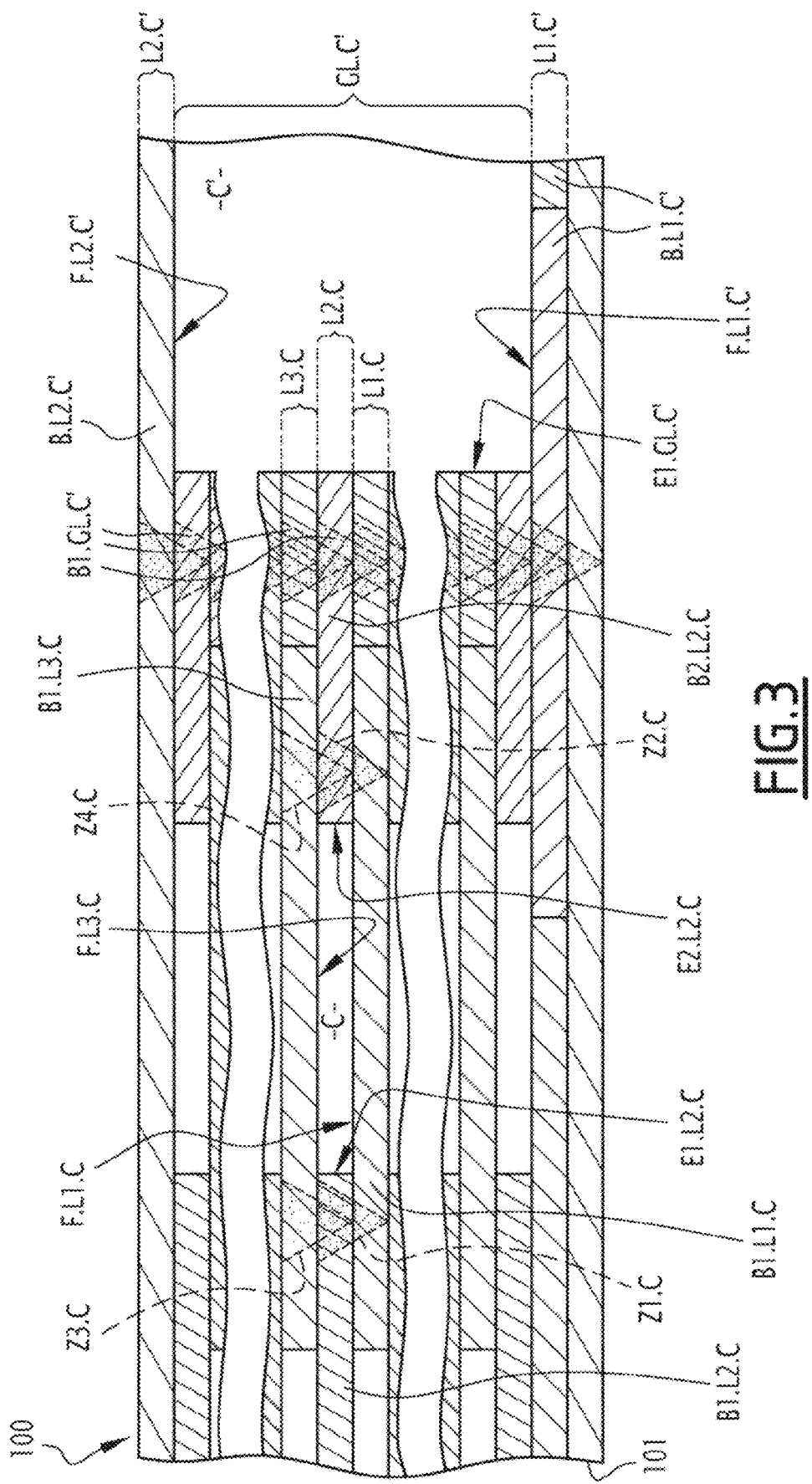
FIG. 3 is a partial sectional view in plane III of FIG. 2.

FIGS. 1 to 3 show a heat exchanger 100. This exchanger 100 is a recuperator exchanger, which allows a transfer of thermal energy through a body 101 of the exchanger, between a first fluid and a second fluid that pass through the body 101, without there being any mixing between the first and second fluids.

As outlined hereinafter, the body 101 is made from metal and has a three-dimensional shape that will be described in reference to an orthogonal coordinate system with axes respectively referenced X-X, Y-Y and Z-Z.

The exchanger 100 includes both channels C, intended for the circulation of the first fluid, and channels C', intended for the circulation of the second fluid. As described in detail hereinafter, the channels C and C' are delimited by the body 101 of the exchanger, extending lengthwise parallel to one another, along the axis X-X, each of these channels C and C' connecting the respective ends of the channel to one another, opposite one another along the axis X-X. During use, that is to say when the exchanger 100 is supplied with the first fluid and with the second fluid in order to perform a heat exchange between these two fluids, the first fluid circulates freely in the channels C, between the opposite axial ends of each of these channels C, while the second fluid circulates freely in the channels C', between the opposite axial end of each of these channels C'.

In the exemplary embodiment considered in FIGS. 1 to 3, the channels C of the exchanger 100 all have the same cross-section, that is to say the section in a plane perpendicular to their axis X-X, which is different from the same cross-section of the channels C'. More specifically, in the example considered here, the cross-section of the channels C' is larger than the cross-section of the channels C: in practice, for reasons whose interest will appear later, the channels C and C' are aligned along the axis Z-Z and are arranged relative to one another, within the body 101 of the exchanger 100, so as to form a pattern associating one of the channels C' and several of the channels C that are arranged at a same level, along the axis Z-Z, as the channel C' of the pattern, the channels C of the pattern being either arranged all on a same axial side, along the axis Y-Y, of the channels C' of the pattern, or distributed, in particular by halves, on both sides, along the axis Y-Y, of the channel C' of the pattern, like in the example considered in the figures. The aforementioned pattern can be repeated several times within the exchanger 100, both in the direction of the axis Y-Y and in the direction of the axis Z-Z: in the example shown in FIG. 1, the considered pattern associates one of the channels C' and one hundred ten channels C, fifty-five of which are located on one side, along the axis Y-Y, of the considered channel C' while the other fifty-five channels C are located on the other axial side, along the axis Y-Y, of the considered channel C', this pattern being repeated at least nine times, namely at least three times along the axis Z-Z and at least three times along the axis Y-Y.

As a non-limiting example, which is appropriate for the pattern associating one hundred ten channels C and one channel C', shown in FIGS. 1 to 3, the aforementioned first fluid is gaseous helium, circulating in the channels C at an average pressure of about 25 bars, while the aforementioned second fluid is a heat transfer oil, circulating in the channels C' at an average pressure of about one bar and at a temperature of the order of 600° K, the temperature of the second fluid being decreased during its circulation through the body 101 so as to cede thermal power to the first fluid.

Returning now to the description of the body 101 of the exchanger 100, FIG. 2 shows that this body 101 is made up of a plurality of layers L, which are flat, each extending in geometric planes perpendicular to the axis Z-Z, and which are superimposed on one another along the axis Z-Z. Each layer L is made up of metal strips B: the strips B of a same layer L all extend lengthwise along a direction that is perpendicular to the axis Z-Z and are adjacent to one another, without necessarily touching, in the plane of the considered layer, each of the strips B of each layer L being provided to occupy the entire thickness, along the axis Z-Z, of the corresponding layer. All of the strips B are made from metal, in particular copper or a copper-based alloy, in particular $CuZn_2$. Furthermore, as described in detail hereinafter, the layers L of the body 101 are secured to one another, while being fusion welded to one another: more specifically, any layer L of the body 101 and the layer L directly superimposed thereon are fusion welded to one another, without added metal and by only partial fusion of the strips, while taking care to ensure that the respective parts of the strips, which have not been welded, retain their edge geometry and remain bearing, along the axis Z-Z, against one another, so as to retain a metallurgical continuity between the layers, as explained in detail in WO 2017/121746, to which the reader may refer for further explanations in this respect. It will be recalled that, inasmuch as the layers L are fusion welded to one another, without added metal, the body 101 of the exchanger 100 is entirely made up of the metal of the strips B of these layers L.

The layers L of the body 101 are arranged so as to define both the channels C, as described just below, and the channels C', as described in detail later.

Thus, as clearly shown in FIG. 3, each channel C is defined in its entirety by three layers, directly superimposed on one another, among the layers L of the body 101. If one further considers, for example, the channel C that is shown in its entirety in the middle of FIG. 3, this channel C is exclusively defined by:
 a first layer L, denoted L1.C in FIG. 3,
 a second layer L, denoted L2.C, which is directly superimposed on the layer L1.C along the axis Z-Z, and
 a third layer L, denoted L3.C, which is directly superimposed on the layer L2.C.

The layer L2.C is thus intercalated, along the axis Z-Z, directly between the layers L1.C and L3.C.

Along the axis Z-Z, the channel C considered above is delimited exclusively by the layers L1.C and L3.C. More specifically, the layer L1.C has a face F.L1.C that is turned, along the axis Z-Z, toward the layers L2.C and L3.C and that, for the layer L1.C, delimits the channel C. In the exemplary embodiment considered here, the face F.L1.C is formed by a strip B1.L1.C of the layer L1.C, which extends lengthwise along the axis X-X and which, as clearly shown in FIG. 3, overflows on either side, along the axis Y-Y, of the channel C. The layer L3.C in turn has a face F.L3.C that is turned, along the axis Z-Z, toward the layers L1.C and L2.C, thus facing, along the axis Z-Z, toward the face F.L1.C, and which, for the layer L3.C, delimits the channel C. In the exemplary embodiment considered here, this face F.L3.C is formed by a strip B1.L3.C of the layer L3.C, which extends lengthwise along the axis X-X and which, as clearly shown in FIG. 3, overflows on either side, along the axis Y-Y, of the channel C. The faces F.L1.C and F.L3.C are thus arranged opposite one another, along the axis Z-Z, while being separated from one another by a distance corresponding to the dimension, along the axis Z-Z, of the channel C.

Along the axis Y-Y, the channel C considered above is delimited exclusively by the layer L2.C, more specifically by two edges E1.L2.C and E2.L2.C of this layer L2.C, which are arranged parallel to the axis X-X and transverse to the plane of the layer L2.C. The edges E1.L2.C and E2.L2.C are opposite another along the axis Y-Y, while being separated by a distance corresponding to the dimension, along the axis Y-Y, of the channel C. The edge E1.L2.C is formed by a strip B1.L2.C of the layer L2.C, which extends lengthwise along the axis X-X, on one of the two axial sides, along the axis Y-Y, of the channel C. The edge E2.L2.C is in turn formed by another strip of the layer L2.C, referenced B2.L2.C, which, like the strip B1.L2.C, extends lengthwise along the axis X-X, but which is located on the axial side, along the axis Y-Y, of the channel C opposite the axial side of the latter where the strip B1.L2.C is located. Thus, the strips B1.L2.C and B2.L2.C of the layer L2.C, which respectively form the edges E1.L2.C and E2.L2.C delimiting the channel C at the layer L2.C, extend lengthwise respectively on either side, along the axis Y-Y, of the channel C.

In practice, inasmuch as the strips B of each layer C extend in the plane of their corresponding layer, while occupying the entire thickness of the latter, it will be understood that it is one of the two main faces of the strip B1.L1.C that forms the face F.L1.C and that it is one of the two main faces of the strip B1.L3.C that forms the face F.L3.C, while it is one of the two lateral sections of the strip B1.L2.C that forms the edge E1.L2.C and it is one of the two lateral sections of the strip B2.L2.C that forms the edge E2.L2.C.

In order to make the channel C tight and to guarantee pressure resistance, the strips B1.L2.C and B2.L2.C are on the one hand fusion welded to the layer L1.C on respective fusion zones Z1.C and Z2.C, which extend continuously over the entire length of the channel between the ends of the latter opposite one another along the axis X-X and which, as clearly shown in FIG. 3, are located, along the axis Y-Y, on either side of the channel C, and on the other hand, fusion welded to the layer L3.C on respective fusion zones Z3.C and Z4.C, which also extend continuously over the entire length of the channel between its opposite ends and which are located, along the axis Y-Y, on either side of the channel C. In the exemplary embodiment considered in the figures, as clearly shown in FIG. 3, the fusion zones Z1.C and Z2.C are respectively provided between the lateral parts of the strip B1.L1.C, which overflow on either side, along the axis Y-Y, of the channel C and, respectively, the strip B1.L2.C and the strip B2.L2.C, while the fusion zones Z3.C and Z4.C are respectively made between the parts of the strip B1.L3.C, which overflow on either side, along the axis Y-Y, of the channel C, and, respectively, the strip B1.L2.C and the strip B2.L2.C.

The preceding considerations regarding the demarcation of the channel C considered above apply to each of the other channels C of the body 101, due to the stacking of the layers L of this body along the axis Z-Z, with the understanding that the layer overhanging the other two layers of the group of three layers defining a given channel among the channels C, in other words the third layer for this channel such as the layer L3.C for the channel C considered above, forms the first layer of the following channel in the stack, that is to say the layer topped by the other two layers in the group of three layers defining the channel overhanging the aforementioned channel. In particular, except for the two channels C furthest from one another along the axis Z-Z within a same pattern of the exchanger 100, each of the channels C can be exclusively delimited by the respective faces, facing toward one another along the axis Z-Z, of two strips similar to the strips B1.L1.C and B1.L3.C, and by the respective lateral sections, opposite one another along the axis Y-Y, of two strips similar to the strips B1.L2.C and B2.L2.C. For reasons in particular linked to the manufacturing of the body 101, the first layer of the channel C topped by the other channels C of a same pattern, can deviate from the preceding considerations, while being made up of the strips B but having an arrangement, within this layer, that is different from that of the strips B within the first respective layers of the other channels C. Likewise, the third layer of the channel C topping all of the other channels C of a same pattern may not have the same elements as those described above for the channel C, while being made up of strips B having a different arrangement from that of the strips B of the third layer of the other channels C. In all cases, fusion zones, similar to the zones Z1.C, Z2.C, Z3.C and Z4.C for the channel C considered in detail above, are provided between the three layers associated with each of the channels C, having noted that, for visibility reasons, these various fusion zones, aside from the zones Z1.C, Z2.C, Z3.C and Z4.C, are not shown in FIG. 3.

Regarding the channels C', each one is defined jointly by at least five layers, directly superimposed on one another, among the layers L of the body 101, or even more than five layers directly superimposed. Thus, if one further considers, for example, the channel C' that is shown in its entirety in FIG. 2 and partially 3, this channel C' is exclusively defined by:
 a first layer L, denoted L1.C' in FIG. 3,
 a second layer L, denoted L2.C', and
 a group of several superimposed layers L, denoted GL.C', which is intercalated, along the axis Z-Z, directly between the layers L1.C' and L2.C'.

Along the axis Z-Z, the channel C considered above is delimited exclusively by the layers L1.C' and L2.C' More specifically, the layer L1.C' has a face F.L1.C' that is turned, along the axis Z-Z, toward the group of superimposed layers GL.C' and the layer L2.C' and that, for the layer L1.C', delimits the channel C'. In the exemplary embodiment considered here, this face F.L1.C' is formed by strips B.L1.C' of the layer L1.C', which extend lengthwise along the axis X-X and which are directly juxtaposed with one another along the axis Y-Y, as clearly shown in FIG. 2. The layer L2.C' in turn has a face F.L2.C' that is turned, along the axis Z-Z, toward the group of superimposed layers GL.C' and the layer L1.C', thus facing, along the axis Z-Z, toward the face F.L1.C', and which, for the layer L2.C, delimits the channel C'. In the exemplary embodiment considered here, this face F.L2.C' is formed by strips B.L2.C' of the layer L2.C', which extend lengthwise along the axis Y-Y and which are directly juxtaposed with one another along the axis X-X, as clearly shown in FIG. 2. The faces F.L1.C' and F.L2.C' are thus arranged opposite one another along the axis Z-Z, while being separated from one another by a distance corresponding to the dimension, along this axis Z-Z, of the channel C'.

Along the axis Y-Y, the channel C' considered above is delimited exclusively by the group of superimposed layers GL.C', more specifically by edges E1.GL.C' and E2.GL.C' of the group of superimposed layers GL.C', each of these edges being arranged parallel to the axis X-X and transverse to the plane of the corresponding layer. The edge E1.GL.C' is opposite, along the axis Y-Y, the edge E2.GL.C', while being separated by a distance corresponding to the dimension, along this axis Y-Y, of the channel C'.

The edge E1.GL.C' is formed by the lateral section of strips B1.GL.C' of the group of superimposed layers GL.C', which extends lengthwise along the axis X-X, on one of the two axial sides, along the axis Y-Y, of the channel C'. The edge E2.GL.C' is in turn formed by the lateral section of strips B2.GL.C' of the group of superimposed layers, which also extend lengthwise along the axis X-X but which are located on the axial side, along the axis Y-Y, of the channel C' opposite the axial side of the latter where the strips B1.GL.C' are located.

According to considerations similar to those developed above, each of the strips B1.GL.C' and B2.GL.C' is fusion welded to the layer(s) of the group GL.C', immediately superimposed on the layer to which the strip belongs or, in the absence of this layer, to the layer L1.C' or to the layer L2.C', this fusion welding of each of the strips B1.GL.C' and B2.GL.C' being done on fusion zones that extend continuously over the entire length of the channel C' between the ends of the latter opposite one another along the axis X-X. Globally, the various fusion zones between the layers L1.C' and L2.C' and the strips B1.GL.C' and B2.GL.C' of the group of superimposed layers GL.C' extend continuously over the entire length of the channel C' and are distributed, along the axis Y-Y, on either side of the channel C', so as to make the channel C' tight and guarantee the pressure resistance thereof. Part of these fusion zones is shown in the right part of FIG. 3.

It will be noted that, as clearly shown in FIG. 3, the strips B1.GL.C' include the strip B2.L2.C of the channel C described in detail above, as well as the strips similar to this strip B2.L2.C of the other channels C of the corresponding stack. Likewise, the strips B2.GL.C' include the strips, similar to the strip B1.L2.C of the channel C described in detail above, of the channels C located on the axial side, along the axis Y-Y, of the channel C' opposite that where the channels C shown in FIG. 3 are located. More generally, it will be understood that the channel C' is partially delimited by the strips of the second layer associated with each of the channels C, which form the edges delimiting this channel C at this second layer. As a result, as clearly shown in FIG. 3, each of the channels C is separated, along the axis Y-Y, from the channel C' only by one of the strips of the second layer associated with each of the channels C, which limits the thickness of material separating the channels C and C' so as to facilitate the thermal exchanges between the two fluids respectively circulating in the channels C and C'.

Like before for the channels C, the preceding considerations regarding the demarcation of the channel C' considered above apply to each of the other channels C' of the body 101, due to the stacking of the layers L of this body along the axis Z-Z.

The structure of the body 101 of the recuperator exchanger 100, which has been described in detail thus far, makes it possible to dimension the channels C as microchannels. In particular, the second layer associated with each of the channels C can advantageously be provided to have a thickness, that is to say a dimension along the axis Z-Z, that is less than or equal to 0.1 mm and the strips of this second layer, forming the lateral edges of the considered channel C, can advantageously be separated, along the axis Y-Y, by 1 mm, or even less than 1 mm: the cross-section of each of the channels C then has an area less than or equal to 0.1 mm². At the same time, the channels C extends lengthwise along the axis X-X over a dimension that may be several millimeters, or even several centimeters. As a result, for the channels C, the ratio between their exchange surface and their exchange volume can be very high, typically greater than 10,000 m²/m³.

Furthermore, also in connection with the structure with superimposed layers of the body 101, the surface state of the walls delimiting the channels C and C' can be controlled. In particular, the faces, and if applicable, the edges delimiting each of the channels C, such as the faces F.L1.C and F.L3.C and the edges E1.L2.C and E2.L2.C of the channel C considered above, advantageously have a surface roughness Ra less than or equal to 0.8 μm, or even less than or equal to 0.3 μm. In practice, such a surface roughness results from the surface state of the strips B used to manufacture the body 101 and/or resurfacing operations that may be implemented during the manufacturing of the body 101, as mentioned hereinafter. Of course, this control of the surface roughness can advantageously apply to the channels C'. Such a surface state for the faces delimiting the channels C and/or C', as well as, if applicable, for the edges delimiting these channels C and/or C', makes it possible to substantially decrease the head losses, as well as to decrease the boundary layer thickness for the fluids circulating in these channels.

Furthermore, the entirety of the body 101 of the exchanger 100 is made from metal, from which the strips B of these layers L are made, having recalled that the latter are fusion welded to one another without added metal: the body 101 thus has an identical thermal conductivity at all points of this body, which is equal to that of the metal making up the strips B. Thus, when the strips B are made from $CuZn_2$ alloy, the body 101 has a thermal conductivity of about 300 W/m.° K at all points.

To manufacture the exchanger 100, it is possible to implement an additive manufacturing method, that is to say a method producing the body 101 iteratively, layer after layer, by providing, for each layer, for depositing the strips of the layer, then welding these strips, the welding operations for example being able to be implemented by applying a laser beam and/or by resistance. In order to meet the finishing requirements if applicable, this method is advantageously completed by operations for material removal, by abrasion, machining or laser ablation.

One example of such a method for manufacturing the exchanger 100 will now be described in light of FIGS. 4 to 10.

Figure 4:
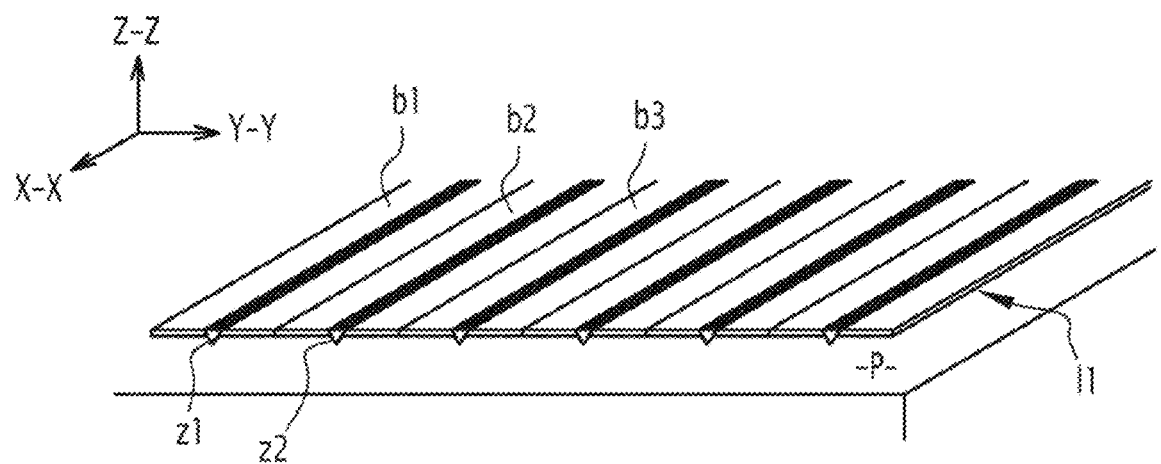
FIG. 4 is a perspective view illustrating a first step of a method for manufacturing the exchanger of FIG. 1.

As shown in FIG. 4, a first step consists of depositing a first layer l1 of strips b1, b2, b3, etc. on a flat metal substrate P, which is oriented perpendicularly to the axis Z-Z and which, in practice, is substantially horizontal. As an example, each of the strips b1, b2, etc. is made from $CuZn_2$, extends lengthwise along the axis X-X over several centimeters, in particular over a length corresponding to the useful and necessary length for the exchanger 100, and has a rectangular cross-section of about 2 mm by 0.1 mm. As shown in FIG. 4, the strips b1, b2, etc. are directly juxtaposed against one another, along the axis Y-Y, while being kept in place on the substrate by any appropriate means, in particular by a welding line z1, z2, etc.

Figure 5:
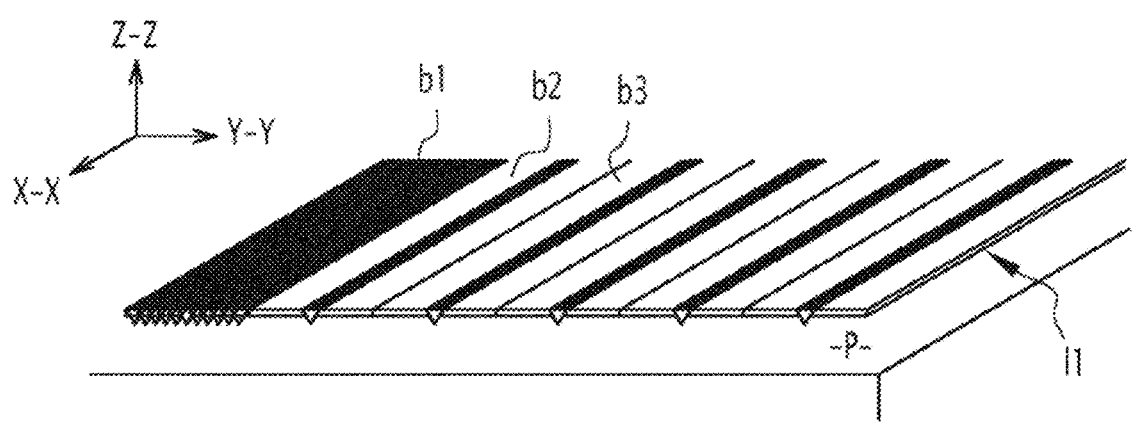
FIGS. 5 to 8 are views similar to FIG. 4, respectively illustrating successive steps of the manufacturing method.

During a second step illustrated in FIG. 5, the set of strips of the layer l1 is fusion welded with the substrate P. The implementation details of this step are given in WO 2017/121746, to which the reader may refer.

Figure 6:
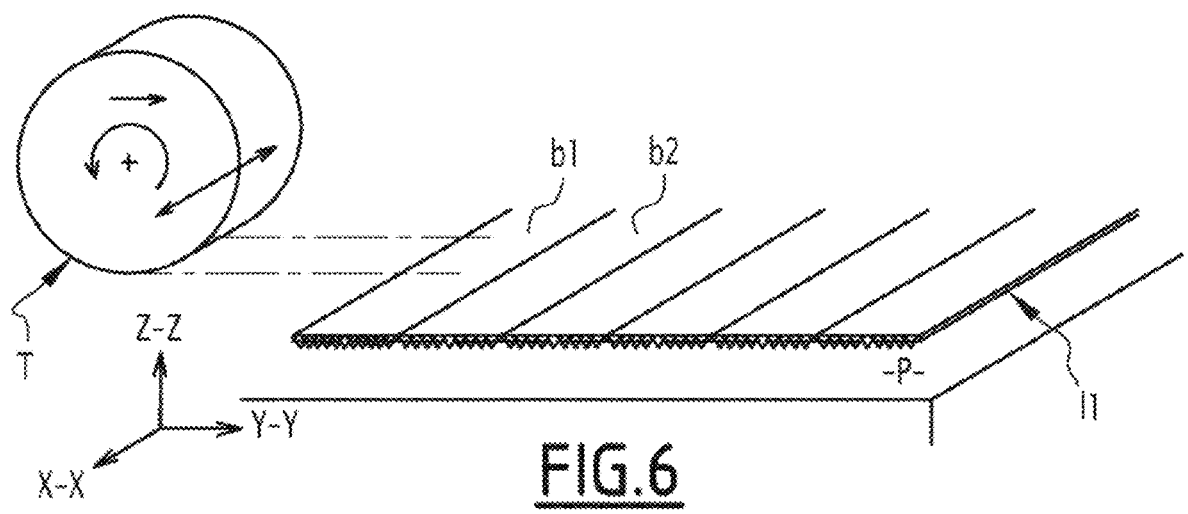

During a third step shown in FIG. 6, the upper face of the layer l1 is flattened by material removal, using an ad hoc tool T acting by abrasion, machining or laser ablation. Here again, the implementation details of this step are given in WO 2017/121746.

During a following step, a new layer of strips, referenced l2, is deposited on the layer l1 and is fusion welded with this layer l1, the strips of the layer l2 extending lengthwise along the axis Y-Y, in other words being offset by 90° relative to the longitudinal direction of the strips of the layer l1. Here again, WO 2017/121746 provides corresponding explanations.

Figure 7:
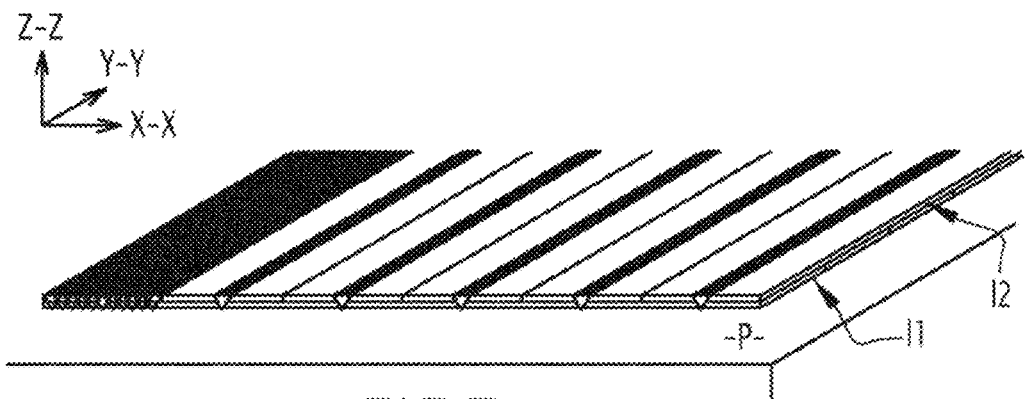

Several other layers can be deposited and fusion welded, subject to the repetition of the steps respectively illustrated by FIGS. 6 and 7. As an example, five layers l1 to l5 are thus carried out one after the other, the five layers thus superimposed being shown in FIG. 8. Before implementing the step illustrated by this FIG. 8, the upper face of the layer l5 is flattened, in particular using the tool T, during a resurfacing step similar to that described in FIG. 6.

Figure 8:
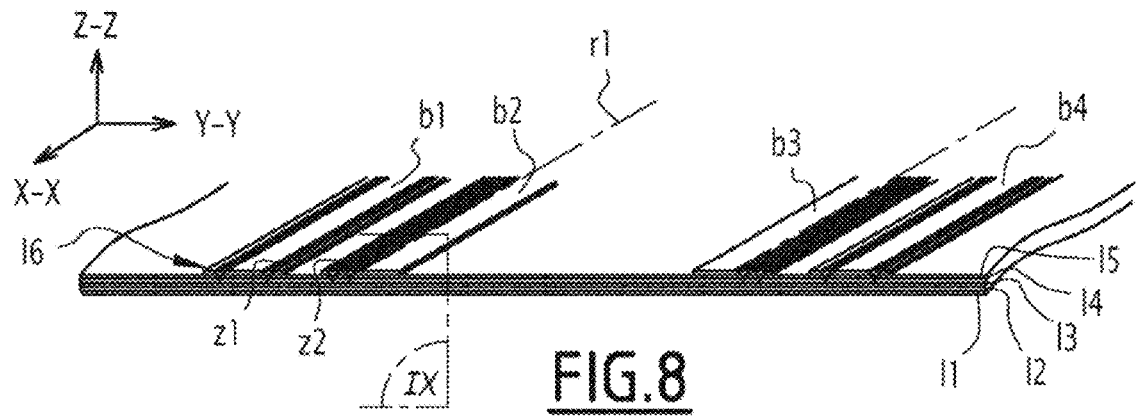

During the step illustrated in FIG. 8, strips b1, b2, b3 and b4 of a layer l6 newly made on the layer l5 are deposited on the layer l5 and are fusion welded with this layer l5. The strips b1, b2, b3 and b4 of the layer l6 each extend lengthwise along the axis X-X.

Figure 9:
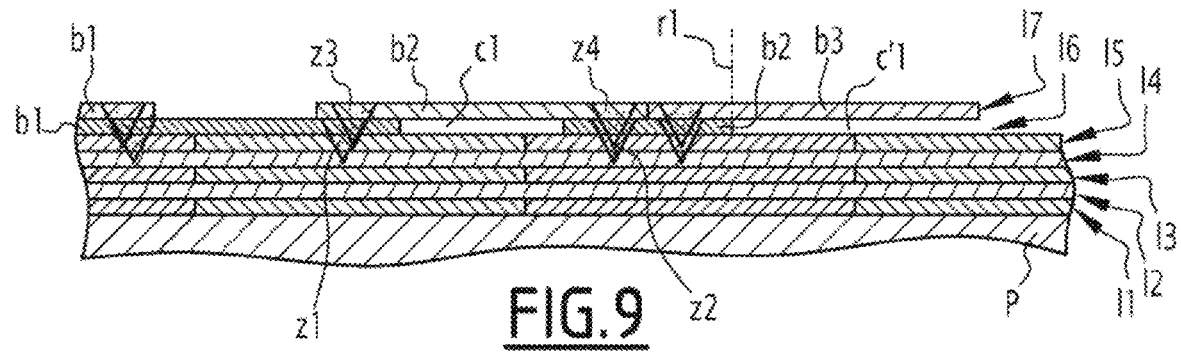
FIG. 9 is a section along plane IX of FIG. 8, illustrating a step of the manufacturing method, implemented after that illustrated by FIG. 8.

Before going to the steps shown in FIG. 9, the upper faces of the strips b1, b2, b3 and b4 of the layer l6 are flattened, here again in particular using the tool T, and more generally, according to considerations similar to those mentioned above in connection with FIG. 6. During the step illustrated in FIG. 9, a new layer, referenced l7, is deposited on the layer l6. In particular, as shown in FIG. 9, the strips b1, b2 and b3 of the layer l7, which extend lengthwise along the axis X-X, are deposited on the strips b1 and b2 of the layer l6.

It will be understood, in particular by comparing FIG. 9 with FIGS. 2 and 3, that the layers l5, l6 and l7 mentioned above respectively correspond to first, second and third layers delimiting a first of the channels C, denoted c1 in FIG. 9. In particular, the strips b1 and b2 of the layer l6 mentioned above respectively correspond to the strips B1.L2.C and B2.L2.C for the channel c1. Likewise, the strip b2 of the layer l7 corresponds to the strip B1.L3.C for the channel c1. It will therefore also be understood that, during the step illustrated in FIG. 8, the fusion welding between the strips b1 and b2 and the layer l5 is done on two fusion zones z1 and z2 that respectively correspond to the fusion zones Z1.C and Z2.C for the channel c1. Likewise, the welding of the layer l7 on the strips b1 and b2 of the layer l6 during the step illustrated in FIG. 9 is done on the fusion zones z3 and z4 that respectively correspond to the fusion zones Z3.C and Z4.C for the channel c1.

Also by comparing FIG. 9 with FIGS. 2 and 3, it will be understood that the layers l5, l6 and l7 mentioned above participate in delimiting a first of the channels C', denoted c'1 in FIG. 9. In particular, the strip b2 of the layer 16 and the strip b3 of the layer 17 form edges of the channel c'1: inasmuch as the strips used in this exemplary manufacturing method all have the same width, it is necessary to resurface the strip b2 of the layer 16 and the strip b3 of the layer 17. In FIG. 8, the resurfacing of the strip b2 of the layer 16 is indicated in mixed lines, referenced r1. In FIG. 9, the resurfacing of the strip b3 of the layer 17 is also indicated in mixed lines, referenced r1. In practice, the implementation terms for the corresponding resurfacing operations are not limiting with respect to the invention, any appropriate resurfacing tool being able to be used. Likewise, the implementation moment of these resurfacing operations can be different from that described above in connection with FIGS. 8 and 9.

Figure 10:
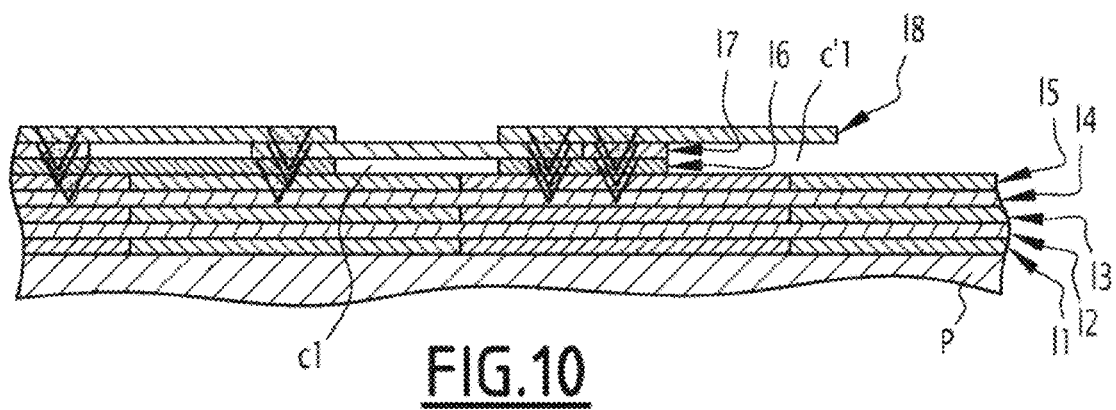
FIG. 10 is a view similar to FIG. 9, illustrating another step of the manufacturing method, subsequent to that illustrated by FIG. 9.

FIG. 10 illustrates a subsequent step, during which a new layer, referenced 18, is deposited and fused on the layer 17. It will be understood that by thus repeating the operations described above in connection with FIGS. 8, 9 and 10, all of the layers L of the body 101 of the exchanger 100 can be produced, while delimiting the channels C and C' in this body 101, taking account of the detailed explanations previously given regarding the specifications for delimiting these channels C and C'.

Figure 11:
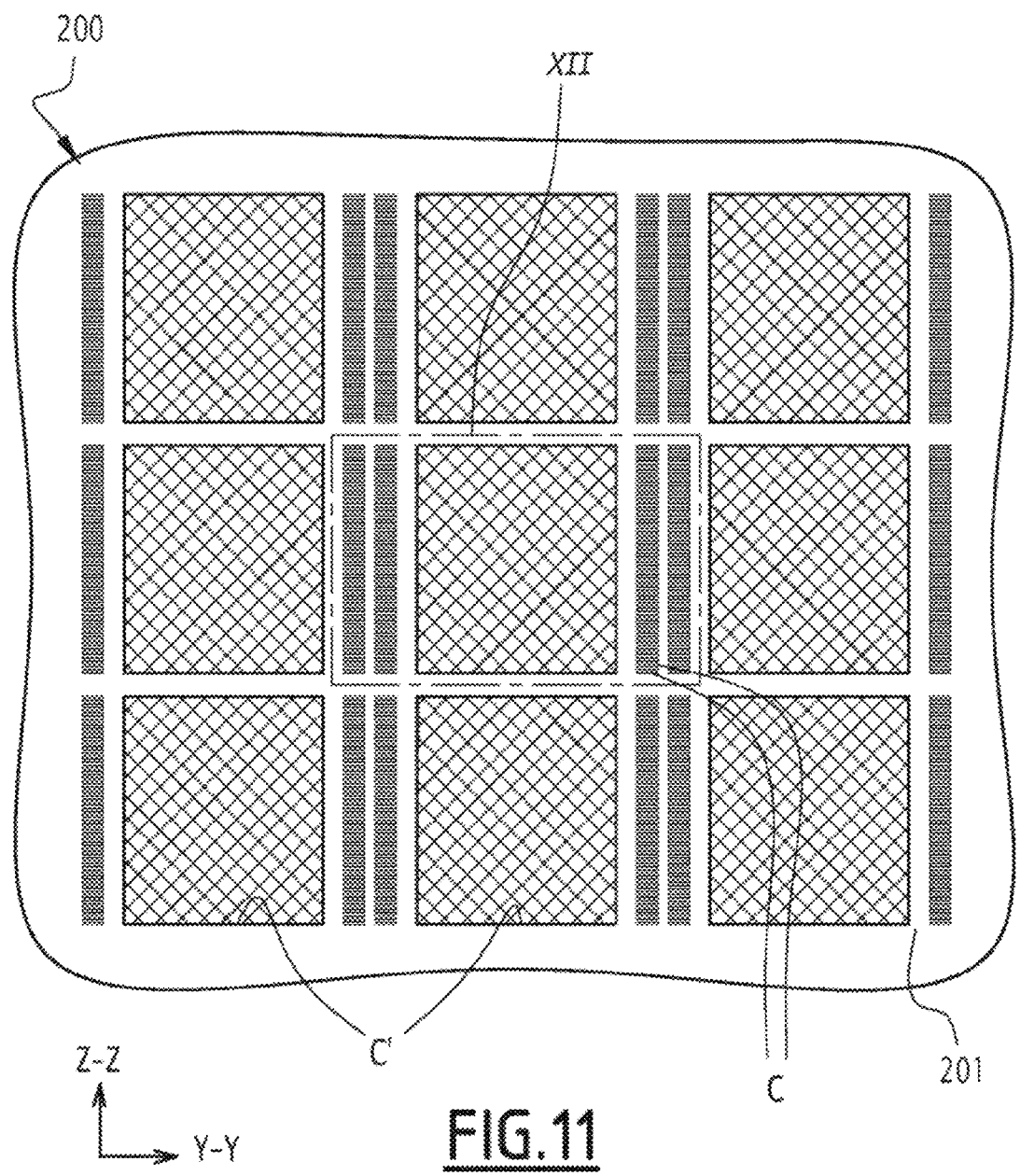
FIG. 11 is an elevation view of a second embodiment of a heat exchanger according to the invention, namely a regenerator exchanger.
Figure 12:
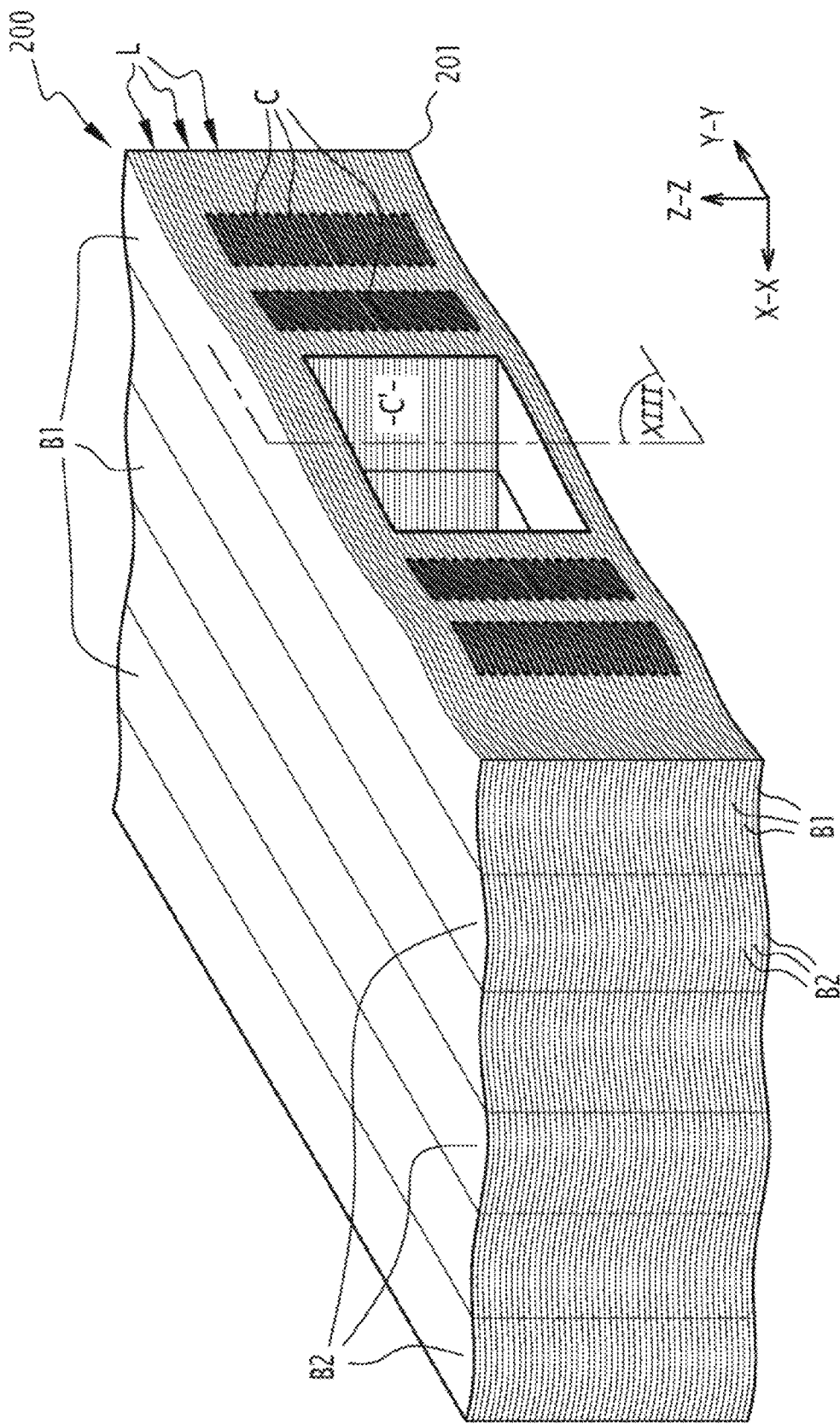
FIG. 12 is a perspective view of a part, box XII in FIG. 11, of the exchanger of FIG. 11.
Figure 13:
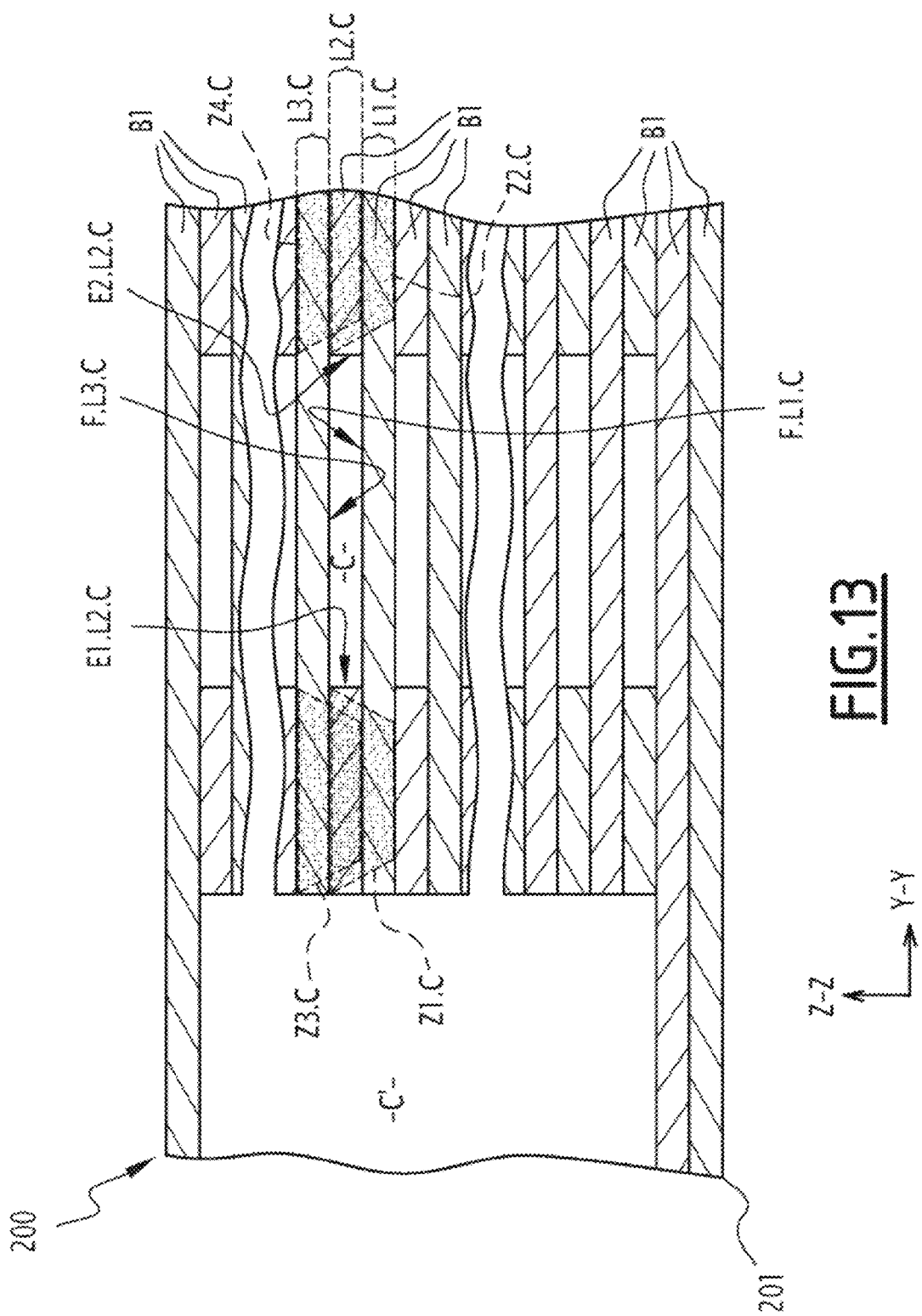
FIG. 13 is a partial sectional view in plane XIII of FIG. 12.

FIGS. 11 to 13 show a heat exchanger 200. This exchanger 200 is a regenerator exchanger, which allows a heat exchange between a fluid and a body 201 of the exchanger in two stages. In a first stage, the fluid circulates through the body 201 of the exchanger 200, while performing a heat exchange in the fluid toward the body 201, such that thermal energy is stored in the body 201. Outside the exchanger 200, the fluid undergoes a transformation, in particular of the temperature, pressure or phase change type, then in a second stage, the fluid circulates in the opposite direction through the body 201, while performing a heat exchange from the body 201 toward the fluid such that all or part of the thermal energy that had been stored in the body 201 during the first stage is returned to the fluid.

Like for the body 101, the body 201 is made from metal and has a three-dimensional shape that will be described in reference to the orthogonal coordinate system with axes X-X, Y-Y and Z-Z.

Like for the exchanger 100, the exchanger 200 includes channels C intended for the circulation of the aforementioned fluid. The exchanger 200 also includes channels C', which are not intended for the circulation of a fluid, but which are intended to contain a thermal insulator, the nature of which is not limiting with respect to the invention and which is only indicated schematically in FIG. 11. Like for the exchanger 100, the channels C and C' of the exchanger 200 are delimited by the body 201 of this exchanger, extending lengthwise parallel to one another, along the axis X-X, each of these channels C and C' connecting the respective ends of the channel to one another, opposite one another along the axis X-X. During use, the exchanger 200 is associated with a hot source and a cold source, such as a hot recuperator and a cold recuperator, between which the aforementioned fluid circulates via the channels C of the exchanger 200. In practice, all of the axial ends of the channels C, located on one side, along the axis X-X, of the body 201 are connected, outside the exchanger 200, to the cold source, while all of the opposite axial ends of the channels C are, at the other axial side, along the axis X-X, of the exchanger 200, connected, outside the exchanger 200, to the hot source. The fluid can thus circulate from the cold source to the hot source, via the channels C, by flowing freely in the latter, and vice versa from the hot source to the cold source.

In the exemplary embodiment considered in FIGS. 11 to 13, the relative arrangement of the channels C and the channels C' of the exchanger 200 is the same as that of the channels C and C' of the exchanger 100. Reference is therefore made to the precisions given previously in this respect, in particular the explanations relative to the pattern associating one of the channels C' and several of the channels C. Furthermore, as a non-limiting example, which is appropriate for the pattern associating one hundred ten channels C and one channel C', shown in FIGS. 11 to 13, the aforementioned fluid is gaseous helium, circulating in the channels C at an average pressure of about 25 bars, with a temperature of the order of 600° K at the hot source and a temperature of the order of 300° K at the cold source. The thermal insulator received in the channels C' can then for example be ceramic powder.

Returning now to the description of the body 201 of the exchanger 200, FIG. 12 shows that this body 201 is, exactly like the body 101 of the exchanger 100, made up of a plurality of layers L, which are flat and superimposed along the axis Z-Z. Similarly to the body 101, each layer L of the body 201 is made up of metal strips, each of these strips of each layer L being provided to occupy the entire thickness, along the axis Z-Z, of the corresponding layer. Conversely, unlike the metal strips B of the exchanger 100, the strips of each layer L of the exchanger 200 all extend lengthwise along the axis Y-Y, while being directly juxtaposed with one another along the axis X-X, as clearly shown in FIG. 12. Additionally, the strips of each layer L of the exchanger 200 are not all made up of the same metal, but on the contrary, are divided into two categories of strips that differ from one another by their component metal: thus, each layer L of the exchanger 200 includes both strips B1 made up of a first metal and strips B2 made up of a second metal, the first and second metals differing from one another by the fact that the first metal has a thermal conductivity different from that of the second metal. At each of the layers L, the strips B1 and the strips B2 are directly juxtaposed with one another along the axis X-X, while alternating: in other words, along the axis X-X, one of the strips B1 follows one of the strips B2, which in turn follows one of the strips B1, and so forth, as clearly shown in FIG. 12. Furthermore, the strips B1 of the different layers L are superimposed on one another along the axis Z-Z and the strips B2 of these layers are also superimposed on one another along the axis Z-Z: in other words, along the axis Z-Z, one of the strips B1 of one of the layers L is topped by one of the strips B1 of the following layer, and so forth; the same is true for the strips B2.

As a non-limiting example, the strips B1 are made from copper or a copper-based alloy, such as $CuZn_2$, and the strips B2 are made from titanium or a titanium-based alloy, such as TA6V. The thermal conductivity of the strips B2 is thus about fifty times less than that of the strips B1. In this example, the strips B1 can be described as conductive strips, while the strips B2 can be described as insulating strips. Irrespective of what two different metals are selected to respectively make up the strips B1 and the strips B2, it will be understood that the body 201 has, due to the arrangement of these strips within the superimposed layers L, an anisotropic thermal conductivity for the body 201. In particular, it is possible to define, for the body 201, two different thermal conductivities, namely a longitudinal thermal conductivity, which corresponds to the thermal conductivity parallel to the direction of the alternating of the strips B1 and B2 at the layers L, in other words parallel to the axis X-X, and a transverse thermal conductivity, which corresponds to the thermal conductivity perpendicular to the direction of the alternating of the strips B1 and B2 in the layers L, in other words parallel to the axis Y-Y.

Similarly to the body 101, the layers L of the body 201 are arranged so as to define both the channels C and the channels C'.

For the channels C, reference is made to the detailed description given previously for the exchanger 101, in particular in connection with FIGS. 2 and 3. Thus, by reusing the same references, FIGS. 12 and 13 illustrate the fact that each channel C of the exchanger 200 is defined in its entirety by three layers, directly superimposed on one another, among the layers L of the body 201, each channel C thus being delimited exclusively by:
- a face F.L1.C of a first layer L1.C and a face F.L3.C of a third layer L3.C separated from the first layer L1.C by a second layer L2.C, and
- edges E1.L2.C and E2.L2.C of the layer L2.C.

The geometric characteristics relative to the faces F.L1.C and F.L3.C and to the edges E1.L2.C and E2.L2.C for the channels C of the exchanger 200 are the same as those, given above, for the channels C of the exchanger 100. Conversely, the composition of these faces and these edges differs for the exchanger 200, due to the fact that all of the strips B1 and B2 of each layer L of the exchanger 200 extends lengthwise along the axis Y-Y. More specifically, it will be understood that each of the faces F.L1.C and F.L3.C of each channel C of the exchanger 200 is formed by the succession, along the axis X-X, of longitudinal portions of the strips B1 and B2 of the corresponding layer L1.C, L3.C. Furthermore, for each channel C, each of the first strip B1 and the second strip B2 of the layer L2.C associated with the channel is locally interrupted, along its length, so as to form the edges E1.L2.C and E2.L2.C delimiting the channel C, as clearly shown in FIG. 13.

According to considerations similar to those mentioned above seeking to make each channel C tight and guarantee the pressure resistance thereof, the strips B1 and B2 of the layer L2.C of each channel C are fusion welded to the corresponding layer L1.C and to the corresponding layer L3.C over fusion zones Z1.C, Z2.C, Z3.C and Z4.C similar to the fusion zones having the same references, described above for the exchanger 100. According to one advantageous optional provision, which is specific to the exchanger 200, each of the strips B1 of the layer L2.C associated with each channel C is fully fusion welded with the respective first strips B1 of the associated layers L1.C and L3.C, superimposed along the axis Z-Z with the considered strip B1 of the layer L2.C, as clearly visible in FIG. 13 for one of the channels C, with the understanding that the same is then true for each of the strips B2 of the layer L2.C of each channel C: in this way, the metallurgical continuity between the strips B1 and the metallurgical continuity between the strips B2, along the axis Z-Z, is improved.

Regarding each channel C' of the exchanger 200, reference is also made to the explanations given above with respect to the demarcation of the channels C' of the exchanger 100. In particular, it will be understood, particularly in light of FIG. 13, that each of the channels C' of the exchanger 200 is delimited by the strips B1 and B2 of all of the superimposed layers delimiting the channels C.

Owing to the alternating of the strips B1 and B2 in each of the layers L of the body 201 of the exchanger 200, while the channels extend lengthwise along the direction of this alternating, the longitudinal thermal conductivity of the exchanger 200 is limited, while at the same time, the transverse thermal conductivity of this exchanger is increased. In this way, the thermal leaks through the exchanger 200 between the hot and cold sources are substantially lessened such that, at the same time, the effusivity and the diffusivity of the exchanger are high. These advantages, which are appreciable for an exchanger of the regenerator type like the exchanger 200, are associated with the interesting geometric characteristics of the channels C, described in detail above for the exchanger 100, in particular the exchange surface/exchange volume ratio, which is high.

To manufacture the exchanger 200, it is possible to implement an additive manufacturing method, exactly like for the exchanger 100. One example of such a method for manufacturing the exchanger 200 will now be described in light of FIGS. 14 to 20.

Figure 14:
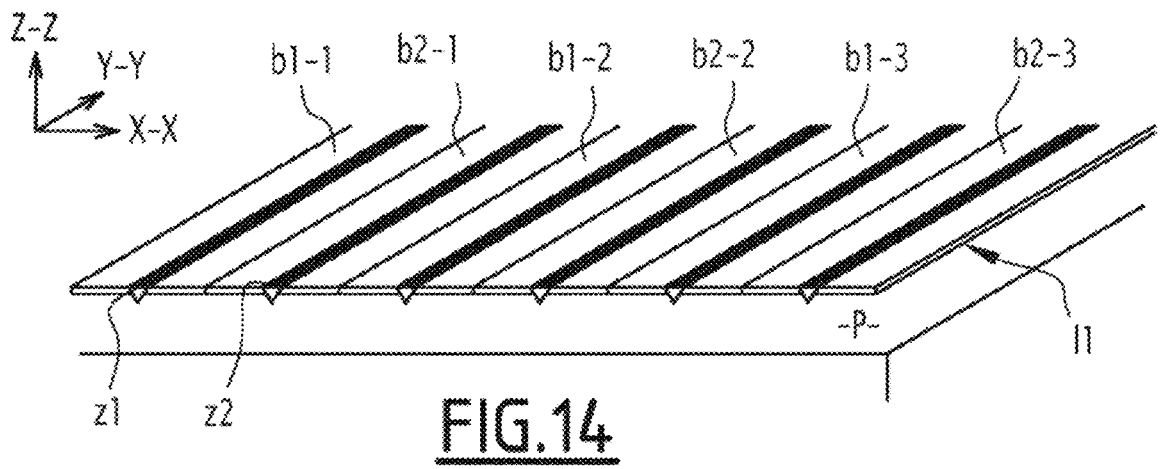
FIG. 14 is a perspective view illustrating a first step of a method for manufacturing the exchanger of FIG. 11.

As shown in FIG. 14, a first step of the method consists of depositing a first layer l1, where the strips b1-1, b1-2, etc. alternate, made up of the aforementioned first metal, with strips b2-1, b2-2, etc. made up of the aforementioned second metal. The layer l1 is deposited on a flat metal substrate P, which is oriented perpendicularly to the axis Z-Z and which, in practice, is substantially horizontal. Each of the strips extends lengthwise along the axis Y-Y and has a rectangular cross-section measuring about 2 mm by 0.1 mm. As shown in FIG. 14, the strips b1-1, b2-1, b1-2, b2-2, b1-3, etc. are directly juxtaposed against one another, along the axis X-X, while being kept in place on the substrate by any appropriate means, in particular by a weld z1, z2, etc. without added metal.

Figure 15:
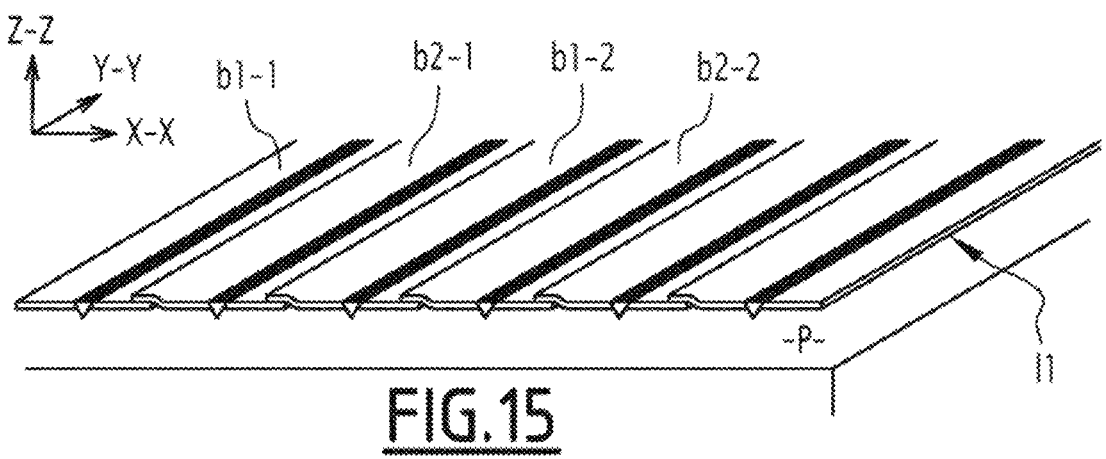
FIG. 15 is a view similar to FIG. 14, illustrating a variant embodiment of the step illustrated in FIG. 14.

FIG. 15 illustrates a variant embodiment for this first step. According to this variant, rather than the lateral rims of the strips of the layer l1 being juxtaposed directly against one another along the axis X-X like in FIG. 14, a lateral fringe of each of the strips is arranged overlapping, along the axis Z-Z, with the adjacent strip, extending along this fringe. This marginal overlap between the strips seeks to improve the metallurgical continuity between the respective metals of the strips made up of the first metal and strips made up of the second metal.

Figure 16:
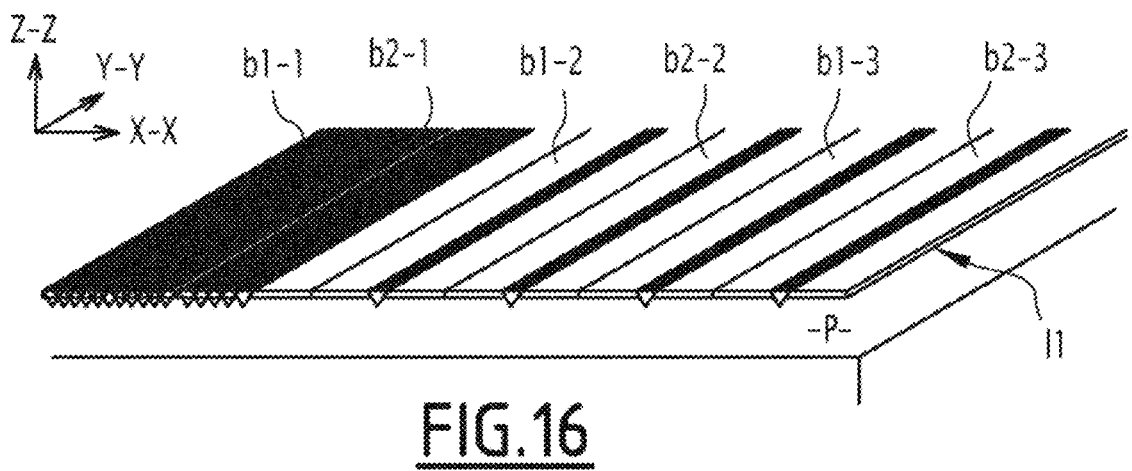
FIGS. 16 to 20 are views similar to FIG. 14, respectively illustrating successive steps of the manufacturing method.

During a second step illustrated in FIG. 16, the set of strips of the layer l1 is fusion welded with the substrate P. The implementation details of this step are given in WO 2017/121746, to which the reader may refer.

Figure 17:
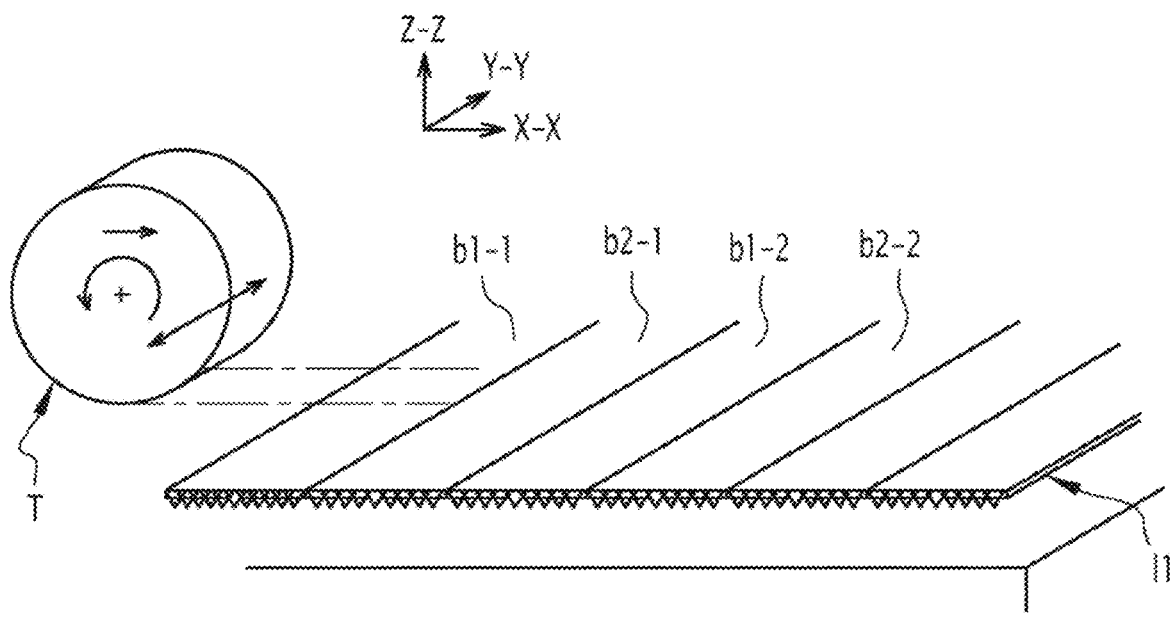

During a third step shown in FIG. 17, the upper face of the layer l1 is flattened by material removal, using an ad hoc tool T acting by abrasion, machining or laser ablation. Here again, the implementation details of this step are given in WO 2017/121746.

Figure 18:
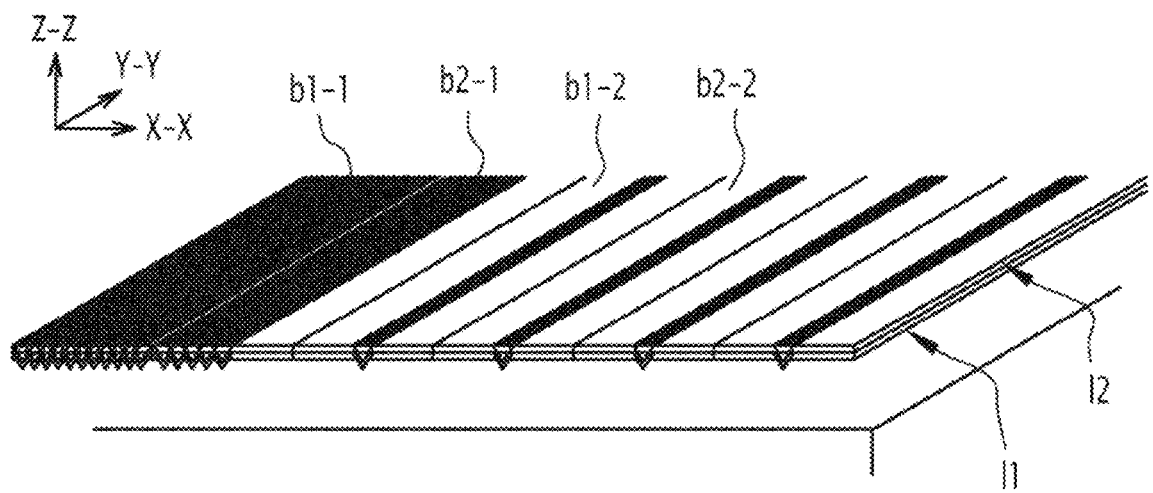

During a following step, illustrated in FIG. 18, a new layer l2 of strips b1-1, b2-1, b1-2, b2-2, etc. is deposited on the layer l1 such that the strips extend lengthwise along the axis Y-Y and the strips b1-1, b1-2, etc. of the layer l2, made up of the first metal, are deposited and fusion welded with the strips b1-1, b1-2, etc. of the layer l1, while the strips b2-1, b2-2, etc. of the layer l2, made up of the second metal, are deposited and fusion welded with the strips b2-1, b2-2, etc. of the layer l1. These deposition and fusion welding operations between the superimposed strips of the layers l1 and l2 are described in detail in WO 2017/121746. Of course, the deposition of the layer l2 on the layer l1 can be done according to the variant shown in FIG. 15.

Several other layers can be deposited and fusion welded, the upper face of each newly deposited layer being flattened by removal of material before depositing the following layer, subject to the repetition of the steps respectively illustrated by FIGS. 17 and 18. As an example, five layers l1 to 15 are thus carried out one after the other, the five layers thus superimposed being shown in FIG. 19. Before implementing the step illustrated by FIG. 19, the upper face of the layer 15 is flattened by removal of material, in particular using the tool T, during a resurfacing step similar to that described in FIG. 17.

Figure 19:
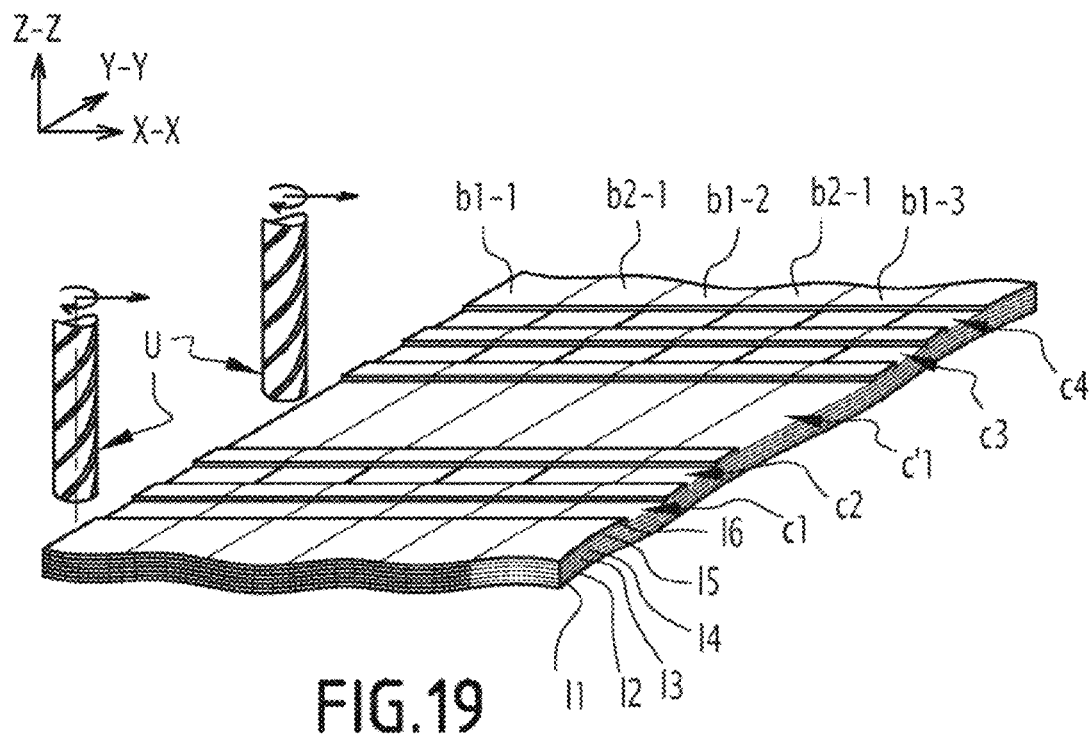

During the step illustrated in FIG. 19, strips b1-1, b2-1, b1-2, b2-2, etc. of a layer 16 newly made on the layer 15 are deposited on the layer 15 and are fusion welded with this layer 15, similarly to the step illustrated in FIG. 18 for the layer 12. Before going to a step shown in FIG. 20 consisting of depositing a new layer 17, the upper face of the strips of the layer 16 is flattened by removal of material, here again in particular using a tool T, and additionally, each of the strips b1-1, b2-1, b1-2, b2-2, etc. of the layer 16 is locally interrupted along its length, in several levels along the strips, as shown in FIG. 19. To that end, one or several machining tools U are applied on the layer 16 so as to machine the corresponding interruptions of the strips there, by removal of material. These interruptions of the strips, each made locally along their length, are done along the axis X-X so as to delimit, in these strips, the respective edges of channels c1, c2, c3 and c4, intended to form some of the channels C, and the respective edges of a channel c'1 intended to form one of the channels C'.

Figure 20:
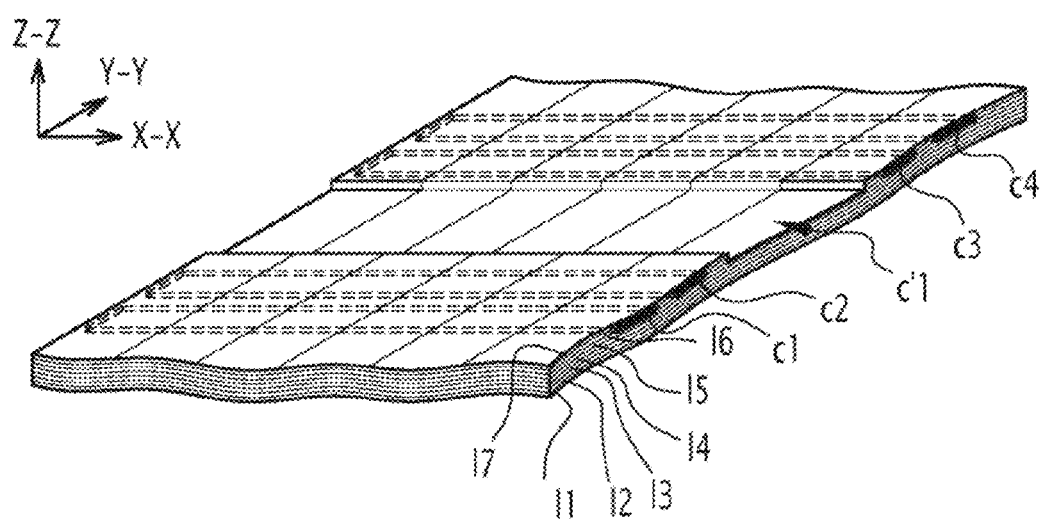

Once the machining of at least one of the channels c1, c2, c3 and c4 delimited at the layer 16 is complete, the layer 17 is deposited and fused on the layer 16, which finishes delimiting these channels c1, c2, c3 and c4. This layer 17 is also machined by removing material to delimit the edges of the channel c'1 therein, by interrupting each of the strips of this layer 17 locally along its length at the channel c'1, as illustrated by FIG. 20. In practice, the machining of the layers in order to produce the channel c'1 can be done at a different moment from what has just been described.

In all cases, it will be understood that by repeating the operations described above in connection with FIGS. 19 and 20, all of the layers L of the body 201 of the exchanger 200 can be produced, while delimiting the channels C and C' in this body 201, taking account of the detailed explanations previously given, with respect to the specifications for delimiting these channels C and C'.

The invention claimed is:

1. A heat exchanger (100; 200),
    including channels (C) for circulation of a fluid, which extend lengthwise along a first axis (X-X) between respective opposite ends of the channels and in which the fluid is intended to flow between said ends along the first axis, the heat exchanger comprising a plurality of layers (L) that are flat and superimposed on one another along a second axis (Z-Z) that is both perpendicular to respective planes of the layers and perpendicular to the first axis (X-X),
    wherein each layer of the plurality of layers is made up of metal strips (B; B1, B2) such that the strips of a same layer all extend lengthwise along a direction perpendicular to the second axis (Z-Z) and are adjacent to one another, without necessarily touching, in the plane of said same layer, each of the strips of each layer of the plurality of layers occupying the entire thickness, along the second axis (Z-Z), of the corresponding layer,
    and wherein each of the channels (C) is defined jointly by first, second and third layers among the plurality of layers, the second layer (L2.C) associated with each channel being intercalated, along the second axis (Z-Z), directly between the first layer (L1.C) and the third layer (L3.C) that are associated with this channel, such that each channel is delimited by:
        a face (F.L1.C) of the first layer associated with this channel, which faces, along the second axis (Z-Z), toward the second and third layers associated with this channel,
        a face (F.L3.C) of the third layer associated with this channel, which faces, along the second axis, toward the first and second layers associated with this channel, and
        edges (E1.L2.C, E2.L2.C) of the second layer associated with this channel, which are arranged parallel to the first axis (X-X) and transverse to the plane of this second layer, these edges being formed by strips (B1.L2.C, B2.L2.C; B1, B2) of this second layer that are fusion welded to the first and third layers associated with this channel over fusion zones (Z1.C, Z2.C, Z3.C, Z4.C) that extend continuously over the entire length of the channel between opposite ends thereof and that are located, along a third axis (Y-Y) perpendicular to the first and second axes, on either side of the channel.

2. The heat exchanger (100; 200) according to claim 1, wherein the second layer (L2.C) associated with each channel (C) has a thickness that is less than or equal to 0.1 mm, and wherein the edges (E1.L2.C, E2.L2.C) associated with each channel are distant, along the third axis (Y-Y), by 1 mm or less than 1 mm.

3. The heat exchanger (100; 200) according to claim 1, wherein the face (F.L1.C) of the first layer (L1.C) and the face (F.L3.C) of the third layer (L3.C) that are associated with each channel (C) have a surface roughness Ra less than or equal to 0.8 μm.

4. The heat exchanger (100; 200) according to claim 3, wherein the edges (E1.L2.C, E2.L2.C) associated with each channel (C) have a surface roughness Ra less than or equal to 0.8 μm.

5. The heat exchanger (100; 200) according to claim 1, wherein the face (F.L1.C) of the first layer (L1.C) and the face (F.L3.C) of the third layer (L3.C) that are associated with each channel (C), as well as the edges (E1.L2.C, E2.L2.C) associated with this channel have a surface roughness Ra less than or equal to 0.3 μm.

6. The heat exchanger (100) according to claim 1,
    wherein said channels are first channels (C) for circulation of a first fluid,
    wherein for each first channel (C), the strips of the second layer (L2.C) associated with this first channel, which form the edges (E1.L2.C, E2.L2.C) delimiting the first channel at this second layer, are a first strip (B1.L2.C) and a second strip (B2.L2.C) that extend lengthwise along the first axis (X-X) and respectively on either side, along the third axis (Y-Y), of the first channel, and
    wherein the heat exchanger (100) includes at least one second channel (C') for circulation of a second fluid:
        that extends lengthwise along the first axis (X-X) between respective opposite ends of the second channel,
        in which the second fluid is intended to flow between the ends of the second channel along the first axis, and
        that is arranged at a same level, along the second axis (Z-Z), as at least some of the first channels (C), while being partially delimited by the first or the second strip (B1.L2.C, B2.L2.C) of the second layers (L2.C) associated with said at least some of the first channels.

7. The heat exchanger (100) according to claim 6, wherein, for each first channel (C), the face (F.L1.C) of the first layer (L1.C) associated with this first channel is formed by a strip (B1.L1.C) of this first layer, which extends lengthwise along the first axis (X-X) and which, along the third axis (Y-Y), overflows on either side of this first channel so as to be both superimposed with and welded on the corresponding fusion zones (Z1.C, Z2.C) with the first and second strips (B1.L2.C, B2.L2.C) of the second layer (L2.C) associated with this first channel, and wherein, for each first channel, the face (F.L3.C) of the third layer (L3.C) associated with this first channel is formed by a strip (B1.L3.C) of this third layer, which extends lengthwise along the first axis (X-X) and which, along the third axis (Y-Y), overflows on either side of this first channel so as to be both superimposed with and welded on the corresponding fusion zones (Z3.C, Z4.C) with the first and second strips of the second layer associated with this first channel.

8. The heat exchanger (100) according to claim 6, wherein the or each second channel (C') is defined jointly by first and second layers and a group of superimposed layers among the plurality of layers (L), the group of superimposed layers (GL.C') associated with this second channel being intercalated, along the second axis (Z-Z), directly between the first layer (L1.C') and the second layer (L2.C') associated with this second channel, such that the or each second channel is delimited by:

a face (FL1.C') of the first layer associated with this second channel, which faces, along the second axis, toward the third layer and the group of superimposed layers (GL.C') associated with the second channel, a face (FL2.C') of the second layer associated with this second channel, which faces, along the second axis, toward the first layer and the group of superimposed layers associated with the second channel, and edges (E1.GL.C', E2.GL.C') of the group of superimposed layers (GL.C') associated with this second channel, which are each arranged parallel to the first axis (X-X) and transverse to respective planes of the layers of this group of superimposed layers, these edges being formed by strips of the layers of the group of superimposed layers, which:

extend lengthwise along the first axis (X-X), are, at each of the layers of the group of superimposed layers, fusion welded to the layer(s) of said group, which are immediately superimposed on one of the layer(s) of said group, or otherwise, to the first layer or to the second layer, over fusion zones that extend continuously over the entire length of the second channel between the opposite ends of this second channel and that are located, along the third axis (Y-Y), on either side of this second channel, and include the first and/or second strips (B1.L2.C, B2.L2.C) of the second layer (L2.C) of each of said at least some first channels (C).

9. A method for manufacturing a heat exchanger (100) according to claim 6, wherein the layers (L) of the plurality of layers of the heat exchanger (100) are made one after the other such that each layer of the plurality of layers, which is newly made, is superimposed, along the second axis (Z-Z), on a layer of the plurality of layers, previously made, or, in the absence of this layer previously made, on a flat metal substrate (P) that is perpendicular to the second axis, wherein, to produce each first channel, it is successively provided that:

i) after having deposited the first layer (L1.C) associated with this first channel, this first layer is flattened on a face facing, along the second axis (Z-Z), away from a layer previously made or, in the absence of the latter, opposite the substrate (P), ii) the first and second strips (B1.L2.C, B2.L2.C) of the second layer (L2.C) associated with this first channel are deposited on this first layer, while extending lengthwise along the first axis (X-X) and respectively on either side, along the third axis (Y-Y), of the first channel to be made, and are fusion welded with this first layer on the fusion zones (Z1.C, Z2.C) for these first and second layers, iii) this second layer is flattened on a face facing, along the second axis (Z-Z), away from the first layer, and iv) the third layer associated with this first channel is deposited on the first and second strips of the second layer and fusion welded with these strips on the fusion zones (Z3.C, Z4.C) for the second and third layers, and wherein at least some of the first channels are made one after the other, by using the third layer of a first channel previously made as first layer of a first channel to be made and by repeating steps i), ii), iii) and iv).

10. The heat exchanger (200) according to claim 1, wherein, for each channel, the strips of the first layer associated with this channel, the strips of the second layer associated with this channel and the strips of the third layer associated with this channel extend lengthwise along the third axis (Y-Y) and are distributed into first strips (B1) made from a first metal and second strips (B2) made from a second metal, the first metal having a thermal conductivity different from that of the second metal, these first and second strips being, at each of the first, second and third layers associated with the channel, arranged alternating along the first axis (X-X) such that the first strips (B1) of the first, second and third layers associated with the channel are superimposed along the second axis (Z-Z) and the second strips (B2) of the first, second and third layers associated with the channel are superimposed along the second axis, and wherein for each channel, each of the first and second strips (B1, B2) of the second layer (L2.C) associated with this channel is locally interrupted, along a length thereof, so as to form the edges (E1.L2.C, E2.L2.C) delimiting this channel.

11. The heat exchanger (200) according to claim 10, wherein, for each channel (C):

each of the first strips (B1) of the second layer (L2.C) associated with this channel is completely fusion welded both with the first strip of the first layer associated with the channel, with which this first strip of the second layer is superimposed, and with the first strip of the third layer (L3.C), with which this first strip of the second layer is superimposed, forming the fusion zones (Z1.C, Z2.C) for the first and second layers, and each of the second strips (B2) of the second layer associated with this channel is completely fusion welded both with the second strip of the first layer associated with this channel, with which this second strip of the second layer is superimposed, and with the second strip of the third layer associated with this channel, with which this second strip of the second layer is superimposed, forming the fusion zones (Z3.C, Z4.C) for the second and third layers.

12. The heat exchanger (200) according to claim 10, wherein said channels are first channels (C) for circulation of the fluid, and wherein the heat exchanger (200) further includes at least one second channel (C') for thermal insulation:

that extends lengthwise along the first axis (X-X) between respective opposite ends of this second channel, in which a thermal insulator is received, and that is arranged at a same level, along the second axis (Z-Z), as at least some of the first channels (C), while being delimited by the first and second strips (B1, B2) of the first, second and third layers of said at least some first channels.

13. A method for manufacturing a heat exchanger (200) according to claim 10, wherein the layers of the plurality of layers of the heat exchanger (200) are made one after the other such that each layer of the plurality of layers, which is newly made, is superimposed, along the second axis (Z-Z), on a layer of the plurality of layers, which is previously made, or, in the absence of this layer previously made, on a flat metal substrate (P) that is perpendicular to the second axis, wherein, to produce each channel, it is successively provided that:

i) after having deposited the first and second strips (B1, B2) of the first layer (L1.C) associated with this channel, this first layer is flattened on a face facing, along the second axis (Z-Z), away from the layer previously made or, in the absence of the latter, opposite the substrate (P), ii) the first strips (B1) of the second layer (L2.C) associated with this channel are deposited on and are fusion welded with the first strips of this first layer and the second strips (B2) of this second layer are deposited on and are fusion welded with the second strips of this first layer, while forming the fusion zones (Z1.C, Z2.C) for the first and second layers, iii) this second layer is flattened on a face facing, along the second axis, away from this first layer, and the channel to be made is machined by removal of material in this second layer by interrupting each of the first and second strips (B1, B2) of this second layer locally along a length thereof, and iv) the first strips (B1) of the third layer associated with this channel are deposited on and are fusion welded with the first strips of this second layer and the second strips (B2) of this third layer are deposited on and are fusion welded with the second strips of this third layer, while forming the fusion zones (Z3.C, Z4.C) for the second and third layers, and wherein at least some of the channels (C) are made one after the other, by using the third layer of a channel previously made as first layer of a channel to be made and by repeating steps i), ii), iii) and iv).

14. The method according to claim 13, wherein during steps ii) and iv), the first strips (B1) and the second strips (B2) are deposited such that a lateral fringe of each strip overlaps, along the second axis (Z-Z), the strip that extends along this lateral fringe.

15. The heat exchanger (100; 200) according to claim 2, wherein the face (F.L1.C) of the first layer (L1.C) and the face (F.L3.C) of the third layer (L3.C) that are associated with each channel (C) have a surface roughness Ra less than or equal to 0.8 μm.

16. The heat exchanger (100; 200) according to claim 2, wherein the face (F.L1.C) of the first layer (L1.C) and the face (F.L3.C) of the third layer (L3.C) that are associated with each channel (C), as well as the edges (E1.L2.C, E2.L2.C) associated with this channel have a surface roughness Ra less than or equal to 0.3 μm.

17. The heat exchanger (100) according to claim 2, wherein said channels are first channels (C) for circulation of a first fluid, wherein for each first channel (C), the strips of the second layer (L2.C) associated with this first channel, which form the edges (E1.L2.C, E2.L2.C) delimiting the first channel at this second layer, are a first strip (B1.L2.C) and a second strip (B2.L2.C) that extend lengthwise along the first axis (X-X) and respectively on either side, along the third axis (Y-Y), of the first channel, and wherein the heat exchanger (100) includes at least one second channel (C') for circulation of a second fluid:

that extends lengthwise along the first axis (X-X) between respective opposite ends of the second channel, in which the second fluid is intended to flow between the ends of the second channel along the first axis, and that is arranged at a same level, along the second axis (Z-Z), as at least some of the first channels (C), while being partially delimited by the first or the second strip (B1.L2.C, B2.L2.C) of the second layers (L2.C) associated with said at least some of the first channels.

18. The heat exchanger (100) according to claim 3, wherein said channels are first channels (C) for circulation of a first fluid, wherein for each first channel (C), the strips of the second layer (L2.C) associated with this first channel, which form the edges (E1.L2.C, E2.L2.C) delimiting the first channel at this second layer, are a first strip (B1.L2.C) and a second strip (B2.L2.C) that extend lengthwise along the first axis (X-X) and respectively on either side, along the third axis (Y-Y), of the first channel, and wherein the heat exchanger (100) includes at least one second channel (C') for circulation of a second fluid:

that extends lengthwise along the first axis (X-X) between respective opposite ends of the second channel, in which the second fluid is intended to flow between the ends of the second channel along the first axis, and that is arranged at a same level, along the second axis (Z-Z), as at least some of the first channels (C), while being partially delimited by the first or the second strip (B1.L2.C, B2.L2.C) of the second layers (L2.C) associated with said at least some of the first channels.

19. The heat exchanger (100) according to claim 4, wherein said channels are first channels (C) for circulation of a first fluid, wherein for each first channel (C), the strips of the second layer (L2.C) associated with this first channel, which form the edges (E1.L2.C, E2.L2.C) delimiting the first channel at this second layer, are a first strip (B1.L2.C) and a second strip (B2.L2.C) that extend lengthwise along the first axis (X-X) and respectively on either side, along the third axis (Y-Y), of the first channel, and wherein the heat exchanger (100) includes at least one second channel (C') for circulation of a second fluid:

that extends lengthwise along the first axis (X-X) between respective opposite ends of the second channel, in which the second fluid is intended to flow between the ends of the second channel along the first axis, and that is arranged at a same level, along the second axis (Z-Z), as at least some of the first channels (C), while being partially delimited by the first or the second strip (B1.L2.C, B2.L2.C) of the second layers (L2.C) associated with said at least some of the first channels.

20. The heat exchanger (100) according to claim 5, wherein said channels are first channels (C) for circulation of a first fluid, wherein for each first channel (C), the strips of the second layer (L2.C) associated with this first channel, which form the edges (E1.L2.C, E2.L2.C) delimiting the first channel at this second layer, are a first strip (B1.L2.C) and a second strip (B2.L2.C) that extend lengthwise along the first axis (X-X) and respectively on either side, along the third axis (Y-Y), of the first channel, and wherein the heat exchanger (100) includes at least one second channel (C') for circulation of a second fluid:

that extends lengthwise along the first axis (X-X) between respective opposite ends of the second channel, in which the second fluid is intended to flow between the ends of the second channel along the first axis, and that is arranged at a same level, along the second axis (Z-Z), as at least some of the first channels (C), while being partially delimited by the first or the second strip (B1.L2.C, B2.L2.C) of the second layers (L2.C) associated with said at least some of the first channels.

\* \* \* \* \*